United States Patent
Iwamoto et al.

(10) Patent No.: US 8,120,475 B2
(45) Date of Patent: Feb. 21, 2012

(54) SECURITY-FEATURE-EQUIPPED ON-VEHICLE DEVICE AND SECURITY-FEATURE CONTROL METHOD OF ON-VEHICLE DEVICE

(75) Inventors: Takao Iwamoto, Tochigi (JP); Hyunjin Yoon, Tokyo (JP); Takuma Higo, Tokyo (JP); Hidehiko Chaki, Saitama (JP); Hirotaka Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 12/327,284

(22) Filed: Dec. 3, 2008

(65) Prior Publication Data

US 2009/0167512 A1    Jul. 2, 2009

(30) Foreign Application Priority Data

Dec. 28, 2007   (JP) .................................. 2007-341212

(51) Int. Cl.
  *B60R 25/10*   (2006.01)
  *B60Q 1/00*    (2006.01)
  *B60R 25/00*   (2006.01)
  *B60D 1/28*    (2006.01)
  *H01H 47/22*   (2006.01)

(52) U.S. Cl. .................. 340/429; 340/425.5; 340/426.4; 340/438; 307/10.2; 180/271

(58) Field of Classification Search .. 340/426.1–426.36, 340/429, 500, 438–462, 463–467, 425.5; 307/10.2; 180/271

See application file for complete search history.

(56) References Cited

U.S. PATENT DOCUMENTS

| | | | | |
|---|---|---|---|---|
| 5,079,538 A | * | 1/1992 | DeFino et al. ........... | 340/426.17 |
| 5,543,776 A | * | 8/1996 | L'Esperance et al. ... | 340/426.25 |
| 5,612,668 A | * | 3/1997 | Scott ......................... | 340/426.13 |
| 5,705,976 A | * | 1/1998 | Howard ..................... | 340/426.34 |
| 6,005,478 A | * | 12/1999 | Boreham et al. ........... | 340/425.5 |
| 6,127,923 A | * | 10/2000 | Howard ..................... | 340/426.34 |
| 2004/0017284 A1 | * | 1/2004 | Flick .......................... | 340/426.1 |
| 2007/0075844 A1 | * | 4/2007 | Taylor ........................ | 340/384.1 |

FOREIGN PATENT DOCUMENTS

| | | |
|---|---|---|
| JP | 61-171641 | 8/1986 |
| JP | 2003-167050 | 6/2003 |
| JP | 2007-112211 | 5/2007 |

* cited by examiner

*Primary Examiner* — Daniel Wu
*Assistant Examiner* — Kam Ma
(74) *Attorney, Agent, or Firm* — Oblon, Spivak, McClelland, Maier & Neustadt, L.L.P.

(57) ABSTRACT

A security-feature-equipped on-vehicle device includes: a vibration detection unit that detects vibration; an alarm sound output unit that outputs a predetermined alarm sound from a speaker; and an alarm sound control unit that going outs from a sleep mode to move into a warning mode when vibration is detected for the first time by the vibration detection unit, causes the alarm sound output unit to output the alarm sound at a predetermined first volume level, shifts from the warning mode into an alarm mode when vibration is detected for the second time within a predetermined time period, and causes the alarm sound output unit to output the alarm sound at a predetermined second volume level higher than the first volume level.

20 Claims, 18 Drawing Sheets

SECURITY-FEATURE-EQUIPPED ON-VEHICLE DEVICE AND SECURITY-FEATURE CONTROL METHOD OF ON-VEHICLE DEVICE

CROSS REFERENCES TO RELATED APPLICATIONS

The present invention contains subject matter related to Japanese Patent Application JP2007-341212 filed in the Japanese Patent Office on Dec. 28, 2007, the entire contents of which being incorporated herein by reference.

BACKGROUND OF THE INVENTION

1. Field of the Invention

The present invention relates to a security-feature-equipped on-vehicle device and a security-feature control method of an on-vehicle device that can suitably find applications in the field of vehicle audio/video devices (to be referred to as vehicle audio devices hereinafter) to be installed in vehicles.

2. Description of the Related Art

Known vehicle security systems are mostly provided to date as genuine installations of automobile manufacturers and single-functional addons having only a security-feature. In other words, vehicle audio devices equipped with security-features have not been marketed so far.

Known vehicle audio devices include those having a removable front panel that the vehicle driver can be freely taken out and carry with him or her when leaving the vehicle in order to enhance the security effect (refer to, e.g., Jpn. Pat. Appln. Laid-Open Publication No. 10-138850).

SUMMARY OF THE INVENTION

However, if the vehicle driver takes out the front panel of such a vehicle audio device when he or she leaves the vehicle, the vehicle only pretends that no vehicle audio device is installed in the vehicle. In other words, there is no guarantee that the main body of the vehicle audio device is not stolen and hence the security effect of such an arrangement is unsatisfactory.

In view of the above-identified circumstances, it is therefore desirable for the present invention to provide a security-feature-equipped on-vehicle device and a method of controlling the security-feature of an on-vehicle device.

In an aspect of the present invention, it is desirable to provide a security-feature-equipped on-vehicle device including: a vibration detection unit that detects vibration; an alarm sound output unit that outputs a predetermined alarm sound from a speaker; and an alarm sound control unit that goes out from a sleep mode to move into a warning mode when vibration is detected for the first time by the vibration detection unit, causes the alarm sound output unit to output the alarm sound at a predetermined first volume level, shifts from the warning mode into an alarm mode when vibration is detected for the second time within a predetermined time period, and causes the alarm sound output unit to output the alarm sound at a predetermined second volume level higher than the first volume level.

With this arrangement, a security-feature-equipped on-vehicle device according to another aspect of the present invention goes out from a sleep mode to move into a warning mode and outputs an alarm sound at a first volume level when it detects vibration for the first time. When the security-feature-equipped on-vehicle device detects vibration for the second time, it determines that the vibration is produced by a thief and shifts from the warning mode into an alarm mode, where it issues an alarm by outputting the alarm sound at a second volume level that is higher than the first volume level to intimidate the thief by the alarm sound.

In an aspect of the present invention, there is provided a security-feature control method of an on-vehicle device including: a warning mode processing step of causing the device to go out from a sleep mode to move into a warning mode when vibration is detected for the first time by the vibration detection unit of the device and having the alarm sound output unit of the device output a predetermined alarm sound at a predetermined first volume level from a speaker; and an alarm mode processing step of causing the device to shift from the warning mode into an alarm mode when vibration is detected for the second time and having the alarm sound output unit to output the alarm sound at a predetermined second volume level higher than the first volume level.

With this arrangement, a security-feature control method of an on-vehicle device according to another aspect of the present invention makes the device go out from a sleep mode to move into a warning mode and output an alarm sound at a first volume level when it detects vibration for the first time. When the on-vehicle device detects vibration for the second time, it determines that the vibration is produced by a thief and shifts from the warning mode into an alarm mode, where it issues an alarm by outputting the alarm sound at a second volume level that is higher than the first volume level to intimidate the thief by the alarm sound.

Thus, security-feature-equipped on-vehicle device according to the present invention goes out from a sleep mode to move into a warning mode when vibration is detected for the first time and outputs a predetermined alarm sound at a predetermined first volume level for warning. When the device detects vibration for the second time, it determines that the vibration is produced by a thief and shifts from the warning mode to move into an alarm mode, where it issues an alarm by outputting the alarm sound at a second volume level that is higher than the first volume level to intimidate the thief by the alarm sound. Thus, the present invention provides a security-feature-equipped on-vehicle device and a security-feature control method of an on-vehicle device that can by far improve the security effect than the conventional art.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, a preferred embodiment of the present invention will be described in greater detail by referring to the accompanying drawings.

(1) Overall Configuration of Security-Feature-Equipped Vehicle Audio Device

Figure 1:
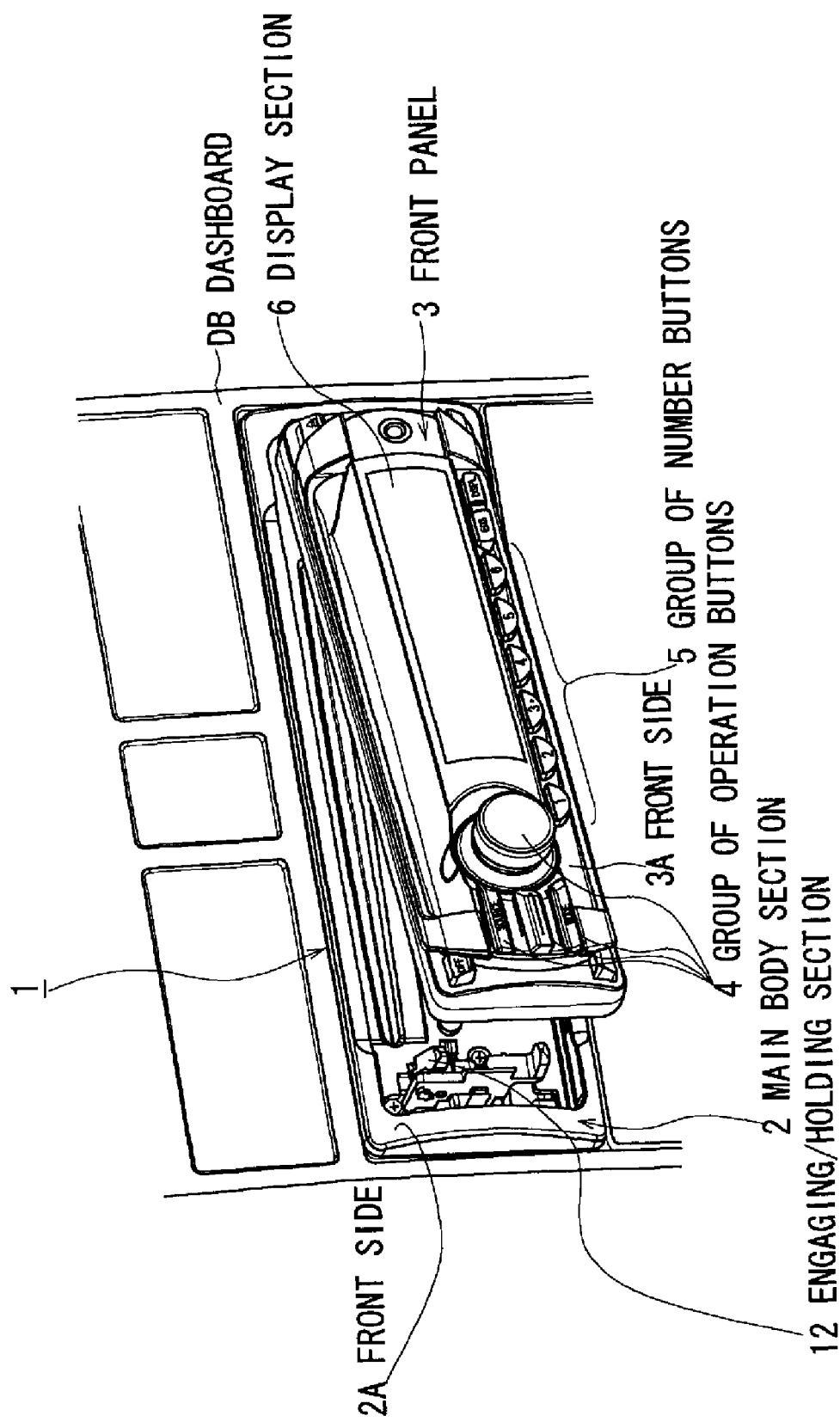
FIG. 1 is a schematic perspective view of a security-feature-equipped vehicle audio device according to an embodiment of the present invention in a state of being installed in a vehicle.

Referring to FIG. 1, 1 generally denotes the embodiment of security-feature-equipped vehicle audio device installed in the dashboard DB of a vehicle. The main body section 2 of the security-feature-equipped vehicle audio device 1 is mostly buried in the dashboard DB and the front side 2A of the main body 2 is partly exposed in FIG. 1. A front panel 3 is removably fitted to the front side 2A of the main body section 2.

More specifically, the security-feature-equipped vehicle audio device 1 has dimensions conforming to the so-called Deutsche Industrie Normen (DIN). In other words, the main body section 2 and the front panel 3 have a width of about 178 mm and a height of about 50 mm.

(1-1) Configuration of Front Panel

A group of operation buttons 4 and a group of number buttons 5 for receiving user's operations and a display section 6 formed by using a liquid crystal display (LED), an organic electroluminescence display (EL) or a vacuum fluorescent display (VFD) to provide information to the user are arranged on the front side 3A of the front panel 3 (FIG. 1) so as to operate as user interface.

(1-2) Configuration of Main Body Section

Figure 2:
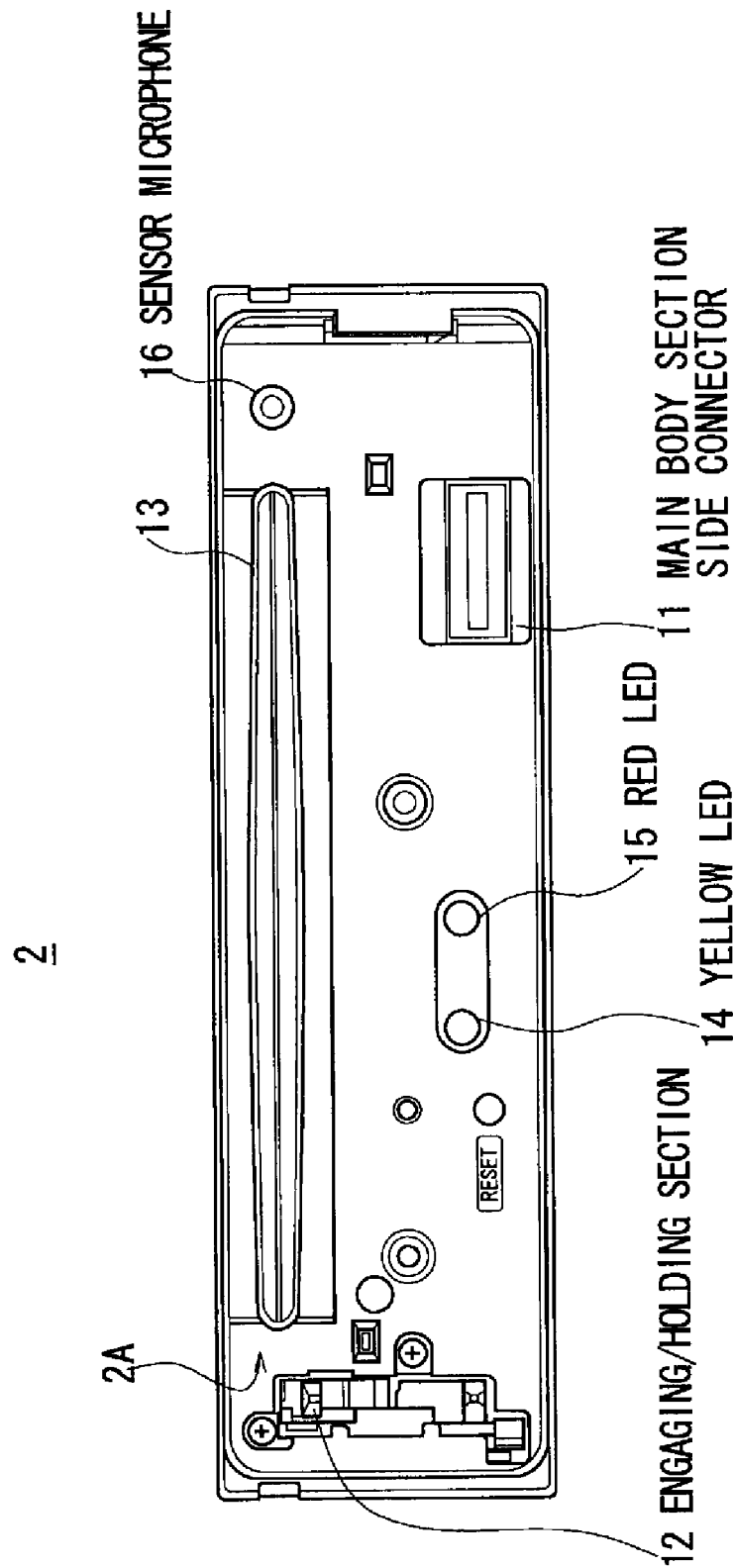
FIG. 2 is a schematic front view of the main body of the device of FIG. 1, showing the coefficient thereof.

As shown in FIG. 2, a main body side connector 11 for realizing physical and electric connections between the front side 2A and the front panel 3 and an engaging/holding section 12 for holding the front panel 3 in a state of being fitted to the front side 2A of the main body section 2 are arranged in the main body section 2.

Thus, when the front panel 3 is fitted to the front side 2A of the main body section 2, the main body side connector 11 of the main body section 2 and the panel side connector (not shown) arranged at the back side of the front panel 3 are physically and electrically connected to each other.

At the same time, as the engaging/holding section 12 arranged at the front side 2A of the main body section 2 and the engaging/holding section (not shown) arranged at the back side of the front panel 3 are mutually engaged with each other, the front panel 3 is held to a state where it is fitted to the front side 2A of the main body section 2.

Therefore, the front panel 3 is released from the state of being physically and electrically connected to the main body section 2 when the mutually engaged state of the engaging/holding section 12 of the main body section 2 and the engaging/holding section (not shown) arranged at the back side of the front panel 3 is dissolved and at the same time the connected state of the main body side connector 11 of the main body section 2 and the panel side connector (not shown) arranged at the back side of the front panel 3 is dissolved.

A disk insertion aperture 13 for inserting a disk, which may be a compact disk (CD) or a digital versatile disk (DVD), having a diameter of about 120 mm and a thickness of about 1.2 mm is formed at the front side 2A of the main body section 2.

Note that, the provision of the disk insertion aperture 13 at the front side 2A of the main body section 2 improves the degree of design freedom relative to the number and the positional arrangement of the group of operation buttons 4, those of the group of number buttons 5 and the size of the display section 6 at the front panel 3.

Additionally, a yellow LED 14 and a red LED 15 for notifying the status and the selected mode of the main body section 2 are arranged substantially at the center of the front side 2A while a sensor microphone 16 for detecting vibration applied to the vehicle is arranged at the upper right corner of the front side 2A of the main body section 2.

(2) Circuit Configuration of Security-Feature-Equipped Vehicle Audio Device 1

Figure 3:
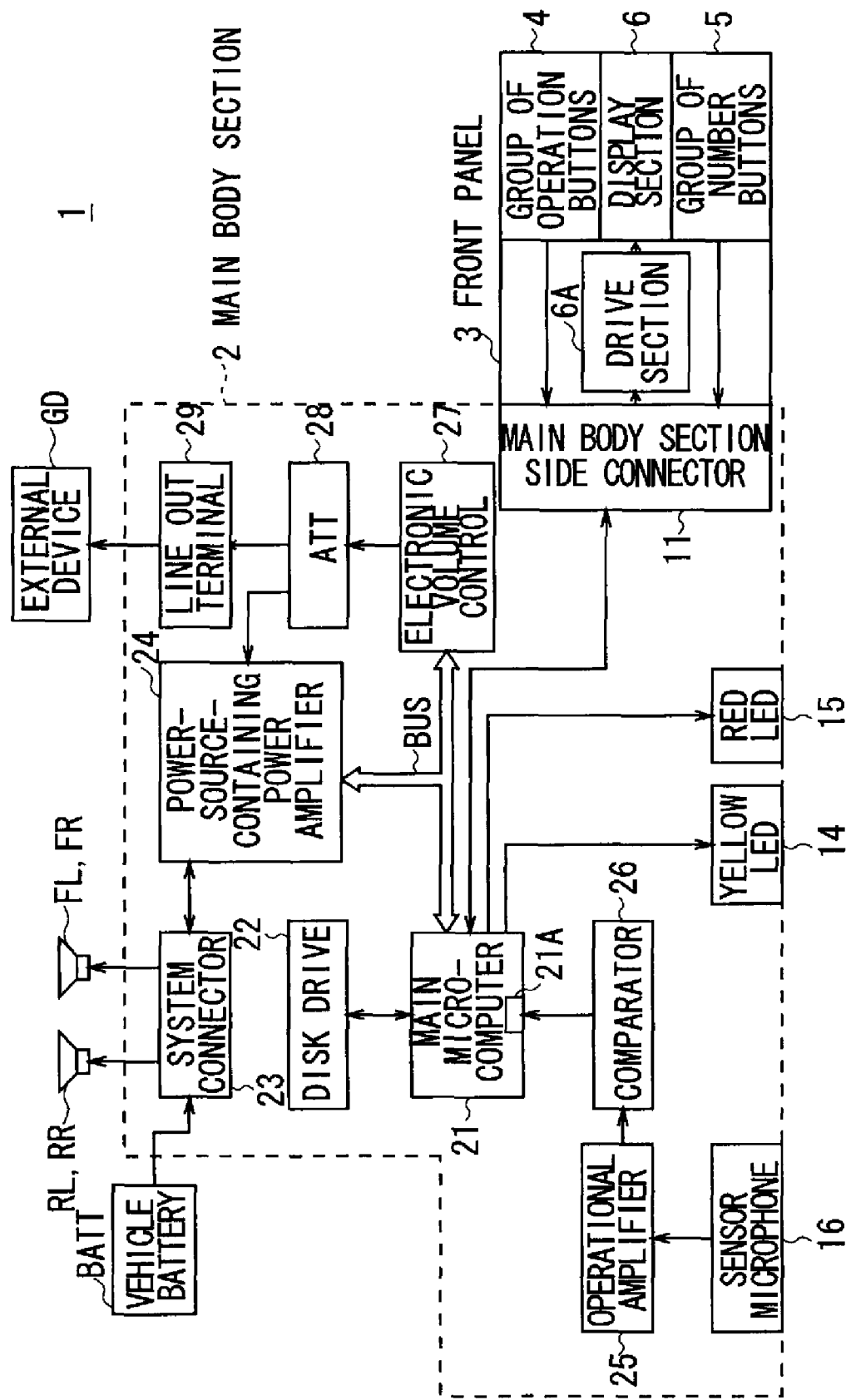
FIG. 3 is a schematic block diagram of a security-feature-equipped vehicle audio device according to the embodiment of the present invention, showing the circuit configuration thereof.

As shown in FIG. 3, the main body section 2 of the security-feature-equipped vehicle audio device 1 operates as power is supplied to all the circuits thereof from the vehicle battery BATT by way of a system connector 23 and a power-source-containing power amplifier 24.

In the main body section 2 of the security-feature-equipped vehicle audio device 1, main microcomputer 21 that operates as a central processing unit (CPU) reads out a basic program from a read only memory (ROM), develops it in a random access memory (RAM) and controls the basic operation of the entire device according to the basic program. The main microcomputer 21 also realizes the security-features, which will be described in greater detail hereinafter, according to various application programs.

For example, as the user depresses the button for replaying a CD out of the group of operation buttons 4 and the group of number buttons 5 and a CD replay command is given to the main microcomputer 21 of the main body section 2 by way of the main body section side connector 11 in response, the main microcomputer 21 replays the CD by way of disk drive 22 and outputs the outcome of the replaying operation to the space inside the vehicle from the front left speaker FL, the front right speaker FR, the rear left speaker RL and the rear right speaker RR by way of an electronic volume control 27, an attenuator 28, the power-source-containing power amplifier 24 and the system connector 23.

The main microcomputer 21 of the main body section 2 can also output the outcome of the replaying operation to an external device GD externally connected by way of the electronic volume control 27, the attenuator 28 and a line-out terminal 29.

Additionally, the main body section 2 detects the vibration applied to the vehicle by means of a sensor microphone 16 arranged at the front side 2A and sends out the result of the detecting operation to operational amplifier 25. The sensor microphone 16 is a microphone like the microphone of an ordinary cellular phone. It is adapted to detect vibration by extracting only the low frequency component (of not higher than 100 Hz) of the sound applied to it by means of a low pass filter (not shown).

The operational amplifier 25 amplifies the outcome of the detecting operation from the sensor microphone 16 before it sends out the outcome to the comparator 26. The comparator 26 compares the detection result supplied from the operational amplifier 25 with a predetermined threshold value and sends out a vibration detection signal indicating the detection of vibration to an interrupt port 21A of the main microcomputer 21 when the detection result exceeds the threshold value.

Note than, the main microcomputer 21 is started in response to the supply of a vibration detection signal from the operational amplifier 25 by way of the interrupt port 21A when the main microcomputer 21 of the main body section 2 is in a sleep status. This is an arrangement for avoiding a situation where the main microcomputer 21 is constantly held in an operation status to waste power coming from the vehicle battery BATT.

When a vibration detection signal is supplied from the comparator 26, the main microcomputer 21 of the main body section 2 can recognize that vibration is applied to the vehicle for some reason or another. Therefore, it outputs a predetermined alarm sound to the front left speaker FL, the front right speaker FR, the rear left speaker RL and the rear right speaker RR by way of the electronic volume control 27, the attenuator 28 and the power-source-containing power amplifier 24.

Thus, the main microcomputer 21 of the main body section 2 can aurally notify the user of the vibration detection result by giving out an alarm sound and also visually notify the user of the vibration detection result by flashing the yellow LED 14 and the red LED 15.

Additionally, the main microcomputer 21 of the main body section 2 sends out status data and menu data for displaying the various statuses of the security-feature-equipped vehicle audio device 1 to the front panel 3 by means of the main body side connector 11.

Thus, the front panel 3 drives the display section 6 by way of the drive section 6A to display the current status of the security-feature-equipped vehicle audio device 1 that is one of various possible statuses that the security-feature-equipped vehicle audio device 1 can take and a variety of menus that the security-feature-equipped vehicle audio device 1 can display on the display section 6 according to the status data and the menu data supplied from the main microcomputer 21 of the main body section 2.

Figure 4:
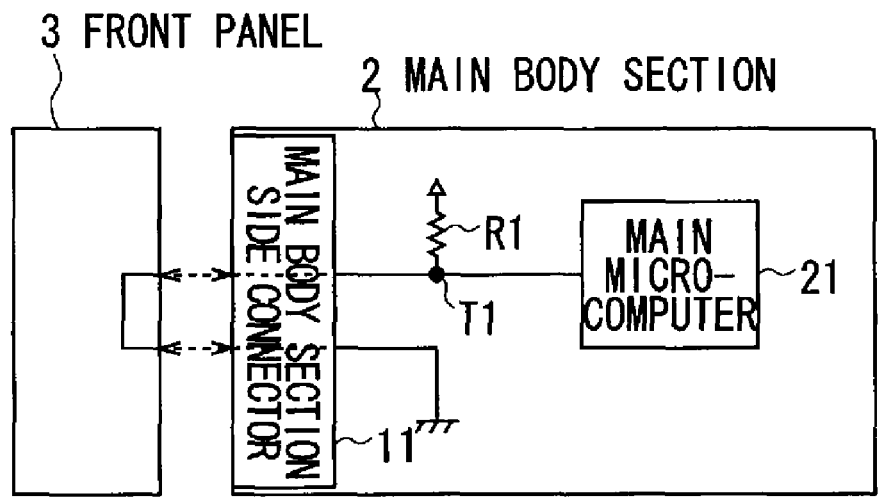
FIG. 4 is a schematic illustration of the arrangement for defecting a fitted state or an unfitted state of the front panel of a security-feature-equipped vehicle audio device according to the embodiment of the present invention.

Meanwhile, when the front panel 3 is taken out from the main body section 2 of the security-feature-equipped vehicle audio device 1, the voltage at the connection point T1 of the main microcomputer 21 and the main body side connector 11 is raised to a predetermined potential level (Hi state) by pull-up resistor R1 in the main body section 2 as shown in FIG. 4. Therefore, the main microcomputer 21 can recognize that the front panel 3 is in a non-mounted status on the basis of the potential level.

When, on the other hand, the front panel 3 is placed in position relative to the main body section 2 of the security-feature-equipped vehicle audio device 1, the main microcomputer 21 in the main body section 2 is grounded by way of the main body side connector 11 and the front panel 3 and the connection point T1 falls to the ground level (Low state) Therefore, the main microcomputer 21 can recognize that the front panel 3 is in a mounted status.

(3) Various Selection/Setting Arrangements

The security-feature of the security-feature-equipped vehicle audio device 1 is so arranged that the user can select and set a mode of operation where the security-feature-equipped vehicle audio device 1 automatically shifts into a security operation control status when the front panel 3 is taken out from the main body section 2, whereas it automatically shifts into a security release status when the front panel 3 is placed in position relative to the main body section 2.

Figure 5:
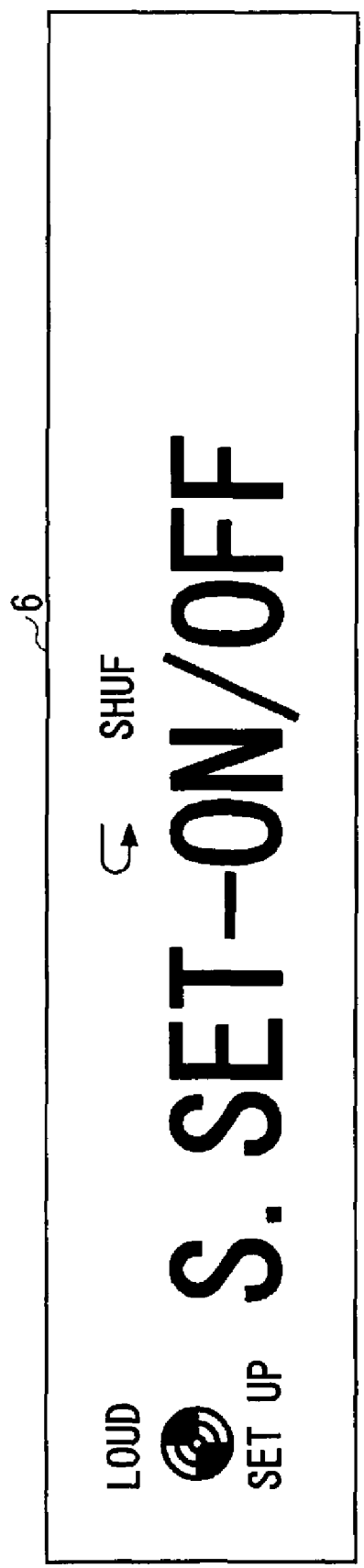
FIG. 5 is a schematic illustration of a security-feature setting image that can be used for the purpose of the present invention.

More specifically, as shown in FIG. 5, when a predetermined one of the buttons of the group of operation buttons 4 at the front panel 3 is depressed, the main microcomputer 21 of the security-feature-equipped vehicle audio device 1 displays characters "S. SET—ON/OFF" on the display section 6 as security selection/setting menu to prompt the user to select either a security-feature on status or a security-feature off status.

As "ON" or "OFF" is selected by the user by means of a cursor (not shown) from the characters "S. SET—ON/OFF" of the security selection/setting menu displayed on the display section 6, the main microcomputer 21 of the security-feature-equipped vehicle audio device 1 automatically selects and sets a security-feature on status or a security-feature off status, whichever appropriate.

Additionally, the security-feature of the security-feature-equipped vehicle audio device 1 is so arranged that the user can select and set a mode of operation where the yellow LED 14 and the red LED 15 of the main body section 2 flash when a predetermined one of the buttons of the group of operation buttons 4 at the front panel 3 is depressed and the security-feature-equipped vehicle audio device 1 shifts from a security standby mode where it does not operate to detect vibration at the vehicle into a security detection mode where it operates to detect vibration at the vehicle to change its security operation control status.

Figure 6:
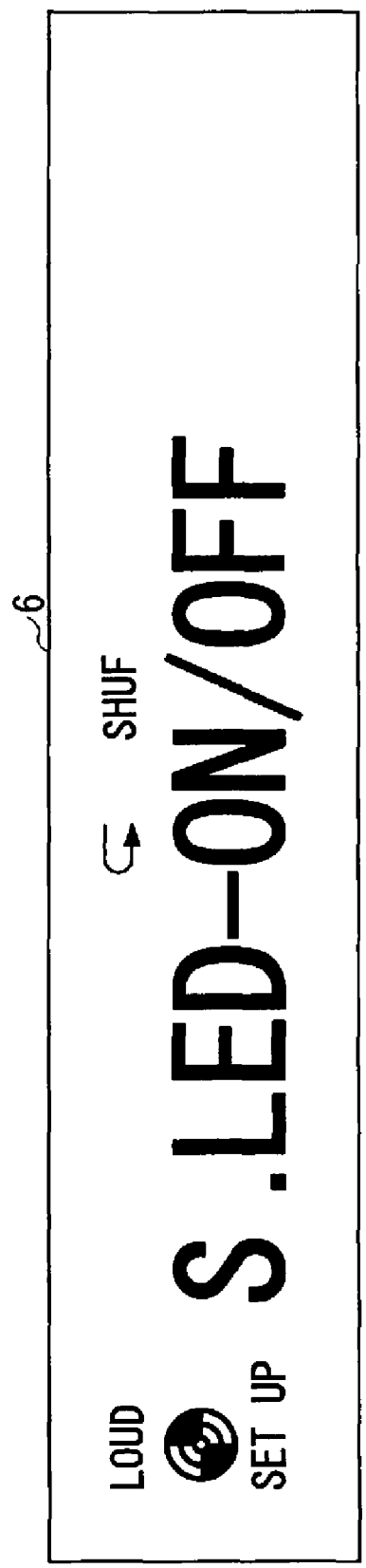
FIG. 6 is a schematic illustration of a security-feature LED setting image that can be used for the purpose of the present invention.

More specifically, the main microcomputer 21 of the security-feature-equipped vehicle audio device 1 displays characters "S. LED—ON/OFF" on the display section 6 as security LED selection menu to prompt the user to select either a flashing mode or non-flashing mode for the yellow LED 14 and the red LED 15 of the main body section 2 as shown in FIG. 6.

As "ON" or "OFF" is selected by the user by means of a cursor (not shown) from the characters "S. LED—ON/OFF" of the security LED selection menu displayed on the display section 6, the main microcomputer 21 of the security-feature-equipped vehicle audio device 1 automatically selects and sets a flashing mode (ON) or a non-flashing mode (OFF) for the yellow LED 14 and the red LED 15.

In Japan, it is a general practice that the yellow LED 14 and the red LED 15 are flashed when the security-feature-equipped vehicle audio device 1 shifts into a security detection mode. However, a flashing yellow LED 14 and a flashing red LED 15 may attract a thief's attention and tell the thief that the main body section 2 is there in some countries or in some districts. Therefore, the user can select "OFF" depending on the situation.

Still additionally, the security-feature of the security-feature-equipped vehicle audio device 1 is so arranged that the user can select and set a mode of operation, or a security standby mode, where the main microcomputer 21 of the security-feature-equipped vehicle audio device 1 does not immediately shift into a security detection mode when the front panel 3 is taken out from the main body section 2 but waits for the time that the user needs for taking out the front panel 3 and leaving the vehicle (to be referred to as standby time hereinafter).

A security standby mode is provided because there can be a situation where the user takes out the front panel 3 from the main body section 2 and produces vibration when he or she leaves the vehicle. The standby time may be selected from 15 seconds, 1 minute or 3 minutes depending on the time that the user may ordinarily take to leave the vehicle for the main body section 2 to detect vibration of the vehicle.

Figure 7:
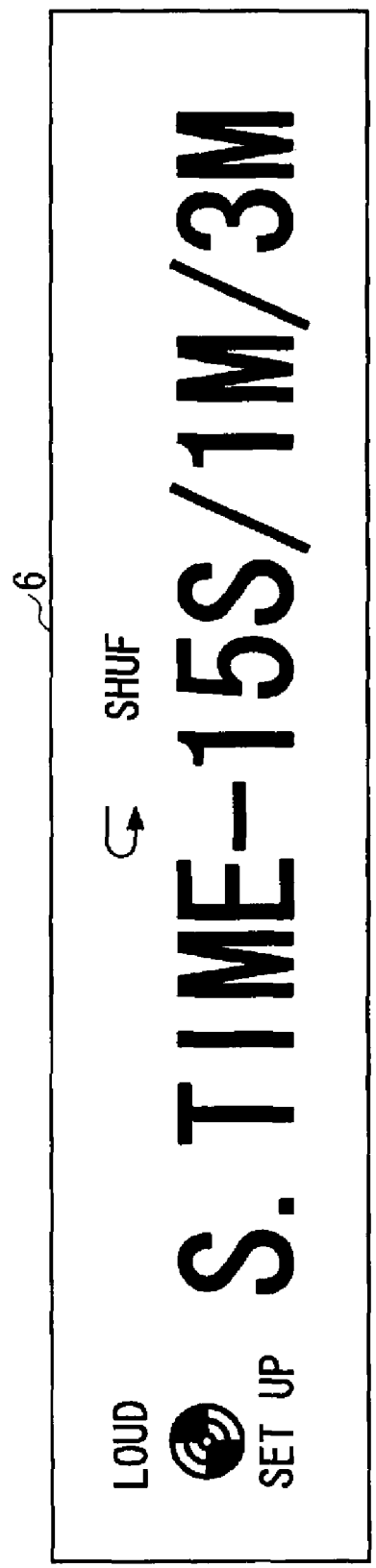
FIG. 7 is a schematic illustration of a standby time setting image for a security standby mode that can use for the purpose of the present invention.
Figure 8:
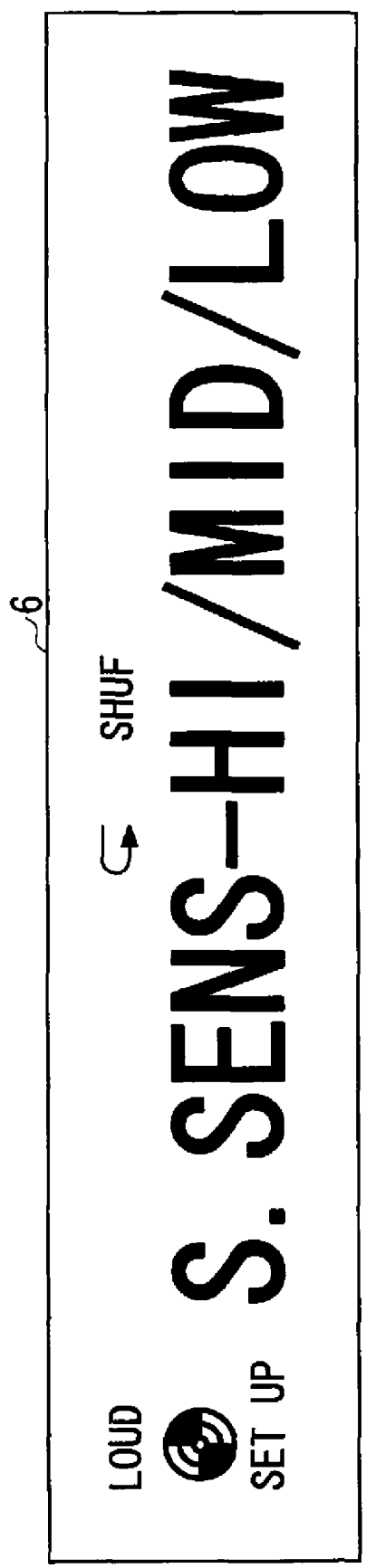
FIG. 8 is a schematic illustration of a sensitivity setting image that can be used for the purpose of the present invention.

More specifically, the main microcomputer 21 of the security-feature-equipped vehicle audio device 1 displays characters "S. TIME—15 S/1 M/3 M" on the display section 6 as security standby time selection menu to prompt the user to select "15 S", "1 M" or "3 M" by means of a cursor (not shown) as shown in FIG. 7. Then, the standby time of the security standby mode is determined to be 15 seconds, 1 minute or 3 minutes accordingly.

Note that the standby time of 1 minute is normally set as default standby time in the security-feature-equipped vehicle audio device 1 on an assumption that 1 minute is sufficient for the user to take out the front panel 3 from the main body section 2 and leave the vehicle. However, the user can select 15 seconds or 3 minutes as alternative standby time.

Furthermore, the main microcomputer 21 of the security-feature-equipped vehicle audio device 1 is so arranged that the user can select a high sensitivity level (HI), an intermediate sensitivity level (MID) and a low sensitivity level (LOW) for the sensitivity of the sensor microphone 16 in a security detection mode.

More specifically, the main microcomputer 21 of the security-feature-equipped vehicle audio device 1 displays characters "S. SENS—HI/MID/LOW" on the display section 6 as security sensitivity selection menu to prompt the user to select "HI", "MID" or "LOW" by means of a cursor (not shown). Then, the secondary sensitivity is determined to be at a high sensitivity level, at an intermediate sensitivity level or at a low sensitivity level accordingly.

Thus, while the user is requested to perform various selection/setting operations in advance for the security-feature-equipped vehicle audio device 1, he or she can alter the selected mode or value anytime while the security-feature-equipped vehicle audio device 1 is in operation.

(4) Shift of Status of Security-Feature

The security-feature-equipped vehicle audio device 1 is so arranged that the status of the security-feature can shift in various different ways depending on the mode of operation selected by the user. Now the shift of status will be described below.

(4-1) Ordinary Operation Mode

Figure 9:
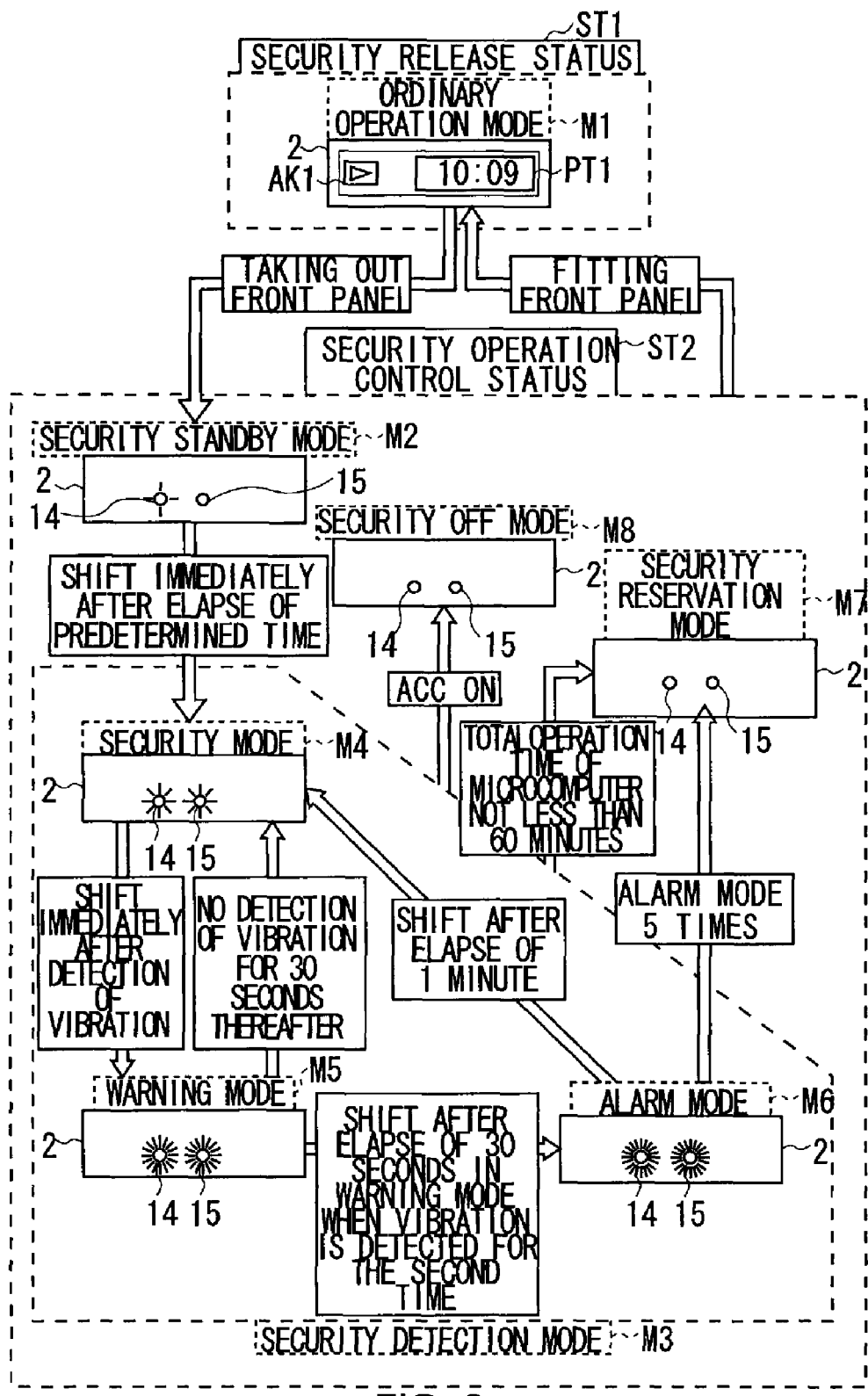
FIG. 9 is a schematic illustration of transition of the status of the security-feature of a security-feature-equipped vehicle audio device according to the embodiment of the present invention.
Figure 10:
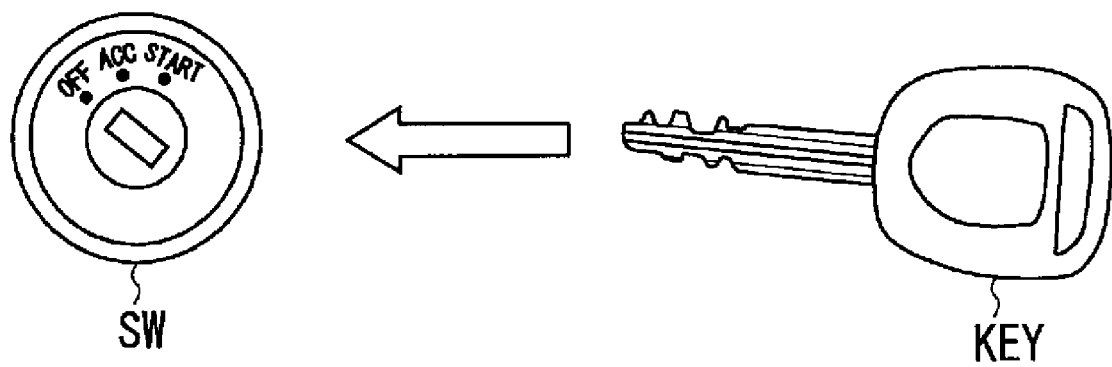
FIG. 10 is a schematic illustration of the key positions that can be used for the purpose of the present invention.

The security-feature-equipped vehicle audio device 1 is in an ordinary operation mode M1 where it is in a security release status ST1 and hence the security-feature is not in operation but the audio feature is operable when the front panel 3 is placed in position relative to the main body section 2 as shown in FIG. 9 and the vehicle key KEY is at "accessory (ACC)" position or at "START" position of the ignition key switch SW as shown in FIG. 10.

In this mode, the main microcomputer 21 of the security-feature-equipped vehicle audio device 1 can display replay icon AK1 showing that a CD or a DVD is being replayed and also the passed replay time PT1 by which the disk has been replayed on the display section 6 of the main body section 2.

When the security-feature-equipped vehicle audio device 1 is in an ordinary operation mode M1 of a security release status ST1, the vehicle key KEY is moved from "ACC" or "START" to "OFF" of the ignition key switch SW, the supply of power from the vehicle battery BATT is stopped and subsequently the front panel 3 is taken out from the main body section 2, the security-feature-equipped vehicle audio device 1 shifts into a security standby mode M2 of a security operation control status ST2.

The security-feature-equipped vehicle audio device 1 also shifts from an ordinary operation mode M1 of a security release status ST1 into a security standby mode M2 of a security operation control status ST2 when the vehicle key is held to "ACC" or "START" of the ignition key switch SW and the front panel 3 is taken out from the main body section 2.

In other words, a situation where the front panel 3 is taken out from the main body section 2 refers to a situation where the user leaves the vehicle, taking the front panel 3 with him or her. Therefore, the action of taking off the front panel 3 triggers a shift from an ordinary operation mode M1 of the security operation control status ST2 into a security standby mode M2 of the security operation control status ST2 in the security-feature-equipped vehicle audio device 1.

(4-2) Security Standby Mode

As the security-feature-equipped vehicle audio device 1 shifts into a security standby mode M2, the main microcomputer 21 of the security-feature-equipped vehicle audio device 1 repeatedly turns on only the yellow LED 14 for 500 msec and turns off for the next 500 msec so as to slowly flash only the yellow LED 14.

With this arrangement, the security-feature-equipped vehicle audio device 1 notifies the user that it has shifted into and currently is in a security standby mode and hence it is not able to detect any vibration by means of the sensor microphone 16 by flashing the yellow LED 14.

Note that the security-feature-equipped vehicle audio device 1 keeps on supplying power from the vehicle battery BATT to the main microcomputer 21 and the sensor microphone 16 of the main body section 2 in a security standby status.

However, if the main body section 2 of the security-feature-equipped vehicle audio device 1 sends out a vibration detection signal from the sensor microphone 16 to the interrupt port 21A of the main microcomputer 21 by way of the operational amplifier 25 and the comparator 26, the main microcomputer 21 is not able to detect the vibration because it is so set as not to read out the vibration detection signal supplied from the comparator 26 to the interrupt port 21A.

Note that the main microcomputer 21 of the main body section 2 does not need to read out the vibration detection signal supplied to the interrupt port 21A and only is flashing the yellow LED 14, it may alternatively be in a sleep status.

In other words, as the security-feature-equipped vehicle audio device 1 shifts from an ordinary operation mode M1 of a security release status ST1 into a security standby mode M2 of a security operation control status ST2, the main microcomputer 21 of the main body section 2 does not read out any vibration detection signal if the user takes out the front panel 3 or gets out of the vehicle to give off vibration during the standby time in the security standby mode M2 (default 1 minute in this instance). Thus, the security standby mode M2 continues.

When default 1 minute of the standby time elapses after shifting into the security standby mode M2, the security-feature-equipped vehicle audio device 1 automatically shifts into a security detection mode M3, The security detection mode M3 includes a security mode M4, a warning mode M5 and an alarm mode M6. The security-feature-equipped vehicle audio device 1 shifts from the security standby mode M2 into the security mode M4 of the security detection mode M3.

Note that, if 15 seconds or 3 minutes is selected for the standby time in the security subsequently mode M2, the security-feature-equipped vehicle audio device 1 shifts from the security standby mode M2 into the security mode M4 of the security detection mode M3 when 15 seconds or 3 minutes elapse.

(4-3) Security Mode

Subsequently, as the security-feature-equipped vehicle audio device 1 shifts from the security standby mode M2 into the security mode M4, the main microcomputer 21 of the main body section 2 gets into a sleep status while it alternately flashes the yellow LED 14 and the red LED 15 at a cycle of 500 msec because they are interlocked with a 500 msec subclock, to notify the user that the security-feature-equipped vehicle audio device 1 has shifted into the security mode M4.

As the security-feature-equipped vehicle audio device 1 shifts into the security mode M4 in this way, the main microcomputer 21 of the main body section 2 falls into a sleep status in order to maximally avoid a situation where power of the vehicle battery BATT is wasted while the user is away from the vehicle.

Then, the main microcomputer 21 of the main body section 2 of the security-feature-equipped vehicle audio device 1 turns on the yellow LED 14 for 500 msec and turns it off for the next 1,500 msec, when it turns on the red LED 15 for 500 msec and turns it off for the next 1,500 msec. In this way, the main microcomputer 21 alternately flashes the yellow LED 14 and the red LED 15. However, the cycle of flashing the LEDs by the security-feature-equipped vehicle audio device 1 is not limited to the above-described one.

Figures 11A, 11B:
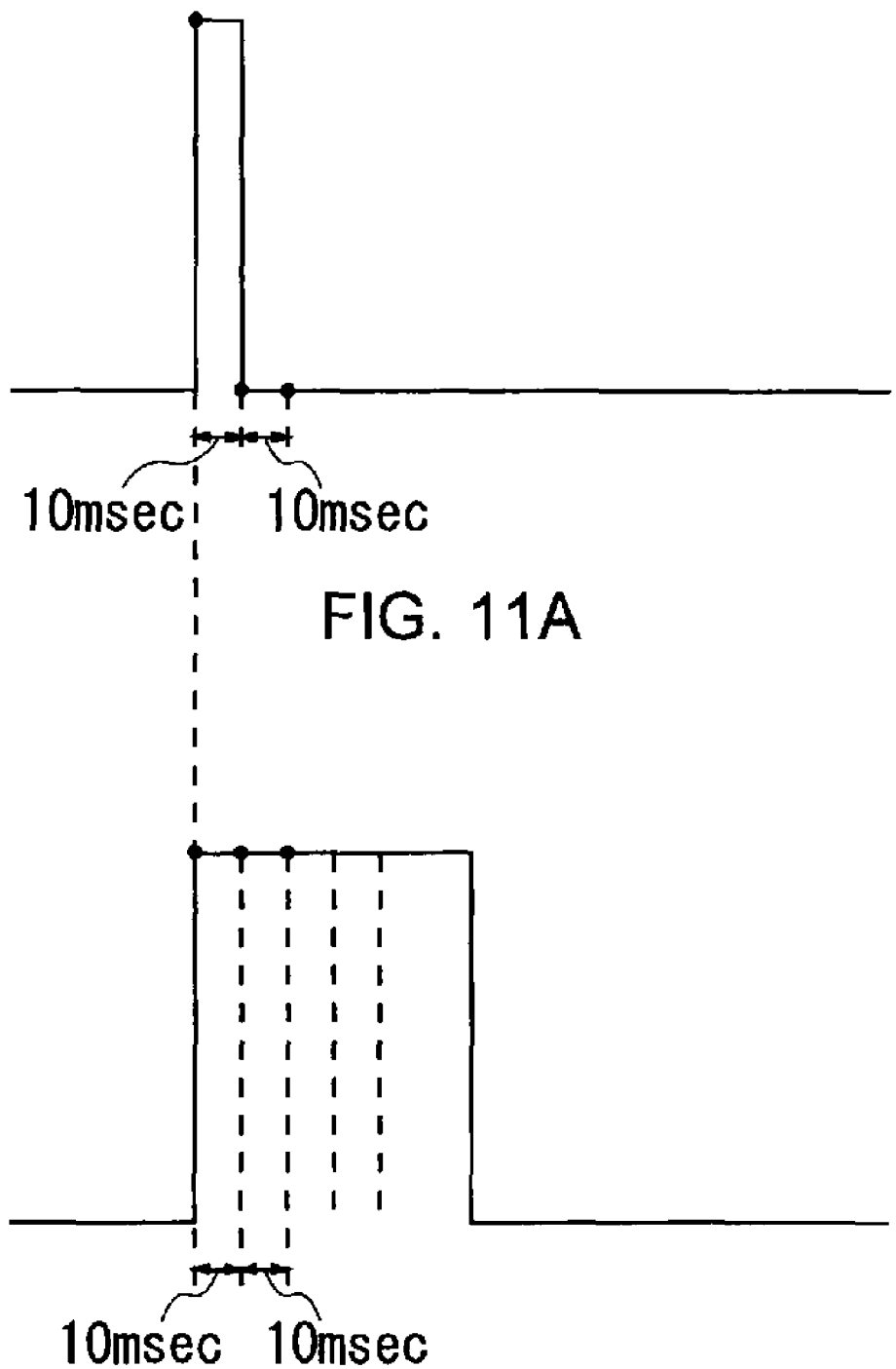
FIGS. 11A and 11B are graphs illustrating the principle of detection of vibration according to the embodiment of the present invention.

In the security mode M4, the main microcomputer 21 of the main body section 2 of the security-feature-equipped vehicle audio device 1 monitors the vibration detection signal supplied to the interrupt port 21A and recognizes that the signal represents the vibration applied to the vehicle only when the vibration detection signal shows the same level for three consecutive cycle periods of 10 msec as shown in FIGS. 11A and 11B. Then, the security-feature-equipped vehicle audio device 1 immediately shifts into a warning mode M5.

The arrangement that the security-feature-equipped vehicle audio device 1 recognizes that the vibration detection signal supplied to the interrupt port 21A represents the vibration applied to the vehicle only when the vibration detection signal shows the same level for three consecutive cycle periods of 10 msec is made in order to eliminate any detection error of detecting so-called chattering (a phenomenon where a plurality of pulses are generated by noise or the like) as vibration.

Therefore, when the vibration detection signal does not show any same level for three consecutive cycle periods of 10 msec, the security-feature-equipped vehicle audio device 1 recognizes that the signal does not represent any vibration applied to the vehicle and represents only a detection error and then shifts from the security mode 4 into a warning mode 5.

(4-4) Warning Mode

As the main microcomputer 21 of the main body section 2 detects vibration once in the security mode M4 and subsequently the security-feature-equipped vehicle audio device 1 shifts into a warning mode M5, the device 1 outputs an alarm sound (e.g., repeated beep sound), for example, at a low level of about 70 dB only for 30 seconds to the space inside the vehicle from the front left speaker FL, the front right speaker FR, the rear left speaker RL and the rear right speaker RR.

At this time, the main microcomputer 21 of the main body section 2 of the security-feature-equipped vehicle audio device 1 aurally and visually notifies the user that it has shifted into a warning mode M5 by the alarm sound and the LED flashing display by simultaneously flashing the yellow LED 14 and the red LED 15 at a cycle period of 200 msec, which is interlocked with the output cycle period of the alarm sound.

Note, however, that security-feature-equipped vehicle audio device 1 does not necessarily interlock the output cycle period of the alarm sound and the cycle period of flashing the yellow LED 14 and the red LED 15. For example, it may alternatively flash the yellow LED 14 and the red LED 15 at a timing of not outputting any alarm sound.

More specifically, the main microcomputer 21 of the main body section 2 of the security-feature-equipped vehicle audio device 1 turns on the yellow LED 14 for 200 msec and subsequently turns it off for 200 msec, exactly when it turns on the red LED 15 for 200 msec and subsequently turns it off for 200 msec so that both the yellow LED 14 and the red LED 15 flash at a cycle period of 200 msec. Note, however, the security-feature-equipped vehicle audio device 1 does not necessarily flash the LEDs at the cycle period of 200 msec.

The warning mode M5 is provided because if vibration is detected only once, it may be generated when the user is riding into or leaving the vehicle and hence incidentally and not given off by a thief. Thus, the main microcomputer 21 of the main body section 2 outputs an alarm sound at a low level of about 70 dB.

If vibration is detected only once and no vibration is detected in the next 30 seconds, for instance, after shifting from the security mode M4 into the warning mode M5, the security-feature-equipped vehicle audio device 1 determines that it is not given off by a thief and returns to the security mode M4 once again.

Thus, if the main microcomputer 21 of the main body section 2 detects vibration once for the next time after returning from the warning mode M5 into the security mode M4, the security-feature-equipped vehicle audio device 1 returns to the warning mode M5 once again.

If, on the other hand, the main microcomputer 21 of the main body section 2 detects vibration once again within 30 seconds after the security-feature-equipped vehicle audio device 1 shifts from the security mode M4 into the warning mode M5, the security-feature-equipped vehicle audio device 1 waits for 30 seconds and then shifts into an alarm mode M6.

It should be stressed here that, when the security-feature-equipped vehicle audio device 1 detects vibration once again in the warning mode M5, it does not immediately shift into the alarm mode M6 but only after the elapse of the 30 seconds in the warning mode M5.

For example, when the security-feature-equipped vehicle audio device 1 detects vibration once again 1 second after shifting into the warning mode M5, it shifts into an alarm mode M6 after the elapse of the remaining 29 seconds but, when it detects vibration once again 29 seconds after shifting into the warning mode M5, it shifts into an alarm mode M6 after the elapse of the remaining 1 second.

In other words, when the security-feature-equipped vehicle audio device 1 detects vibration once again in the warning mode M5, it remains in the warning mode M5 until the elapse of the 30 seconds of the warning mode M5 before it shifts into an alarm mode M6.

This is to avoid a situation where the security-feature-equipped vehicle audio device 1 immediately shifts into an alarm mode M6 and outputs an alarm sound at a high volume level when the user carrying the front panel 3 gives off vibration twice as he or she opens one of the doors of the vehicle, rides into the vehicle and shuts the door.

(4-5) Warning Mode

As the security-feature-equipped vehicle audio device 1 shifts into an alarm mode M6, the main microcomputer 21 of the main body section 2 outputs an alarm sound (e.g., repeated beep sound) from the front left speaker FL, the front right speaker FR, the rear left speaker RL and the rear right speaker RR for the former 30 seconds gradually raising the volume level in 12 steps from the level in the warning mode M5.

Then, the security-feature-equipped vehicle audio device 1 outputs the same alarm sound at a high volume level of about 100 dB, for example, from the front left speaker FL, the front right speaker FR, the rear left speaker RL and the rear right speaker RR for the latter 30 seconds.

At the same time, the main microcomputer 21 of the main body section 2 of the security-feature-equipped vehicle audio device 1 flashes the yellow LED 14 and the red LED 15 at a cycle period of 100 msec, for example, interlocking it with the output cycle period of the alarm sound so as to aurally and visually notify the user that the security-feature-equipped vehicle audio device 1 has shifted into the alarm mode M6 by the alarm sound and the LED flashing display.

Again note, however, that security-feature-equipped vehicle audio device 1 does not necessarily interlock the output cycle period of the alarm sound and the cycle period of flashing the yellow LED 14 and the red LED 15. For example, it may alternatively flash the yellow LED 14 and the red LED 15 at a timing of not outputting any alarm sound.

More specifically, the main microcomputer 21 of the main body section 2 of the security-feature-equipped vehicle audio device 1 turns on the yellow LED 14 for 100 msec and subsequently turns it off for 100 msec, exactly when it turns on the red LED 15 for 100 msec and subsequently turns it off for 100 msec so that both the yellow LED 14 and the red LED 15 flash at a cycle period of 100 msec. Note, however, the security-feature-equipped vehicle audio device 1 does not necessarily flash the LEDs at the cycle period of 100 msec.

The alarm mode M6 is provided because the detected vibration, if any, can be produced by a thief. Thus, the security-feature-equipped vehicle audio device 1 outputs an alarm sound, raising the volume level thereof stepwise to ultimately output it at a high volume of about 100 dB, so as to intimidate the thief by the alarm sound in the alarm mode M6.

More specifically, as the security-feature-equipped vehicle audio device 1 shifts into an alarm mode M6, the main microcomputer 21 of the main body section 2 outputs an alarm sound, gradually raising the volume level thereof in 12 steps from the volume level of about 70 dB, at which it outputs an alarm sound in the warning mode M5, to the volume level of about 100 dB in the former 30 seconds so as to plunge the thief into a fear that the volume level of the alarm sound may infinitely rise and thereby boost the intimidation effect.

As a total of 1 minute elapses after shifting from the warning mode M5 into the alarm mode M6, the security-feature-equipped vehicle audio device 1 automatically stops outputting the alarm sound and also flashing the yellow LED 14 and the red LED 15 to shift into a security mode M4 once again.

In this way, the security-feature-equipped vehicle audio device 1 follows a loop of shift in a security operation control status ST2 from a security standby mode M2 to a security detection mode M3, then to a security mode M4, then to a warning mode M5 and then to an alarm mode M6.

Therefore, after dispelling the thief from the vehicle in the alarm mode M6, the security-feature-equipped vehicle audio device 1 returns to the security mode M4 once again to make it ready for protecting it against another thief.

(4-6) Security Reservation Mode

Meanwhile, the security-feature-equipped vehicle audio device 1 is designed to count the number of times by which it shifts into an alarm mode M6 and computes the total duration of time in which the main microcomputer 21 operates in statuses other than the sleep status.

When, for example, the number of times by which the security-feature-equipped vehicle audio device 1 shifts into a alarm mode M6 gets to five, it then does not return to the security mode M4 but shifts into a security reservation mode M7.

In this mode, the security-feature-equipped vehicle audio device 1 brings the main microcomputer 21 of the main body section 2 into a sleep status and, at the same time, stops the interrupt port 21A from reading out the vibration detection signal supplied from the sensor microphone 16 and also the yellow LED 14 and the red LED 15 from flashing to consequently stop consuming electric power.

Additionally, the security-feature-equipped vehicle audio device 1 shifts into a security reservation mode M7 when the total time to which the main microcomputer 21 operates in statuses other than the sleep status in a security detection mode M3 gets to 60 minutes.

Then, the security-feature-equipped vehicle audio device 1 brings the main microcomputer 21 of the main body section 2 into a sleep status and, at the same time, stops the interrupt port 21A from reading out the vibration detection signal supplied from the sensor microphone 16 and also the yellow LED 14 and the red LED 15 from flashing to consequently stop consuming electric power.

This is because, when the security-feature-equipped vehicle audio device 1 has shifted into a alarm mode M6 five times or when the total duration of time in which the main microcomputer 21 operates in statuses other than the sleep status gets to 60 minutes, electric power has been consumed to a large extent from the vehicle battery BATT of the vehicle while the engine is held to a halt and the battery needs to be prevented from running out as a result of keeping the main microcomputer 12 operating further.

As the security-feature-equipped vehicle audio device 1 recognizes that the user rides in the vehicle and the front panel 3 is fitted to the main body section 2 after shifting into a security reservation mode M7, it returns from the security reservation mode M7 in a security operation control status ST2 back into an ordinary operation mode M1 in a security release status ST1.

Additionally, when the security-feature-equipped vehicle audio device 1 shifts either into a security standby mode M2 or a security detection mode (including a security mode M4, a warning mode M5 and an alarm mode M6) in a security operation control status ST2, it returns from the security operation control status ST2 to the security release status ST1 when it recognizes that the user rides into the vehicle and the front panel 3 is fitted to the main body section 2.

In this way, the security-feature-equipped vehicle audio device 1 shifts into a security operation control status ST2 when the front panel 3 is taken out from the main body section 2 in a security release status ST1 and shifts into a security release status ST1 where the ordinary vehicle audio feature is available when the front panel 3 is fitted to the main body section 2 in a security operation control status ST2. Thus, the security-feature-equipped vehicle audio device 1 repeatedly shifts between the two statuses depending on if the front panel 3 is in a state of being fitted or not fitted to the main body section 2.

The security-feature-equipped vehicle audio device 1 returns to the security release status ST1 when the front panel 3 is fitted to the main body section 2 after shifting into the security reservation mode M7 and, if the main microcomputer 21 of the main body section 2 recognizes that the key KEY of the vehicle is either at the position of "ACC" or at the position of "START" of the ignition key switch SW at that time, the security-feature-equipped vehicle audio device 1 notifies the user that the vehicle audio device 1 is currently in a security release status ST1 but was in a security reservation mode M7 one step ago by displaying characters "SECU—RESERVE" temporarily (e.g., for 5 seconds) on the display section 6 of the front panel 3.

When the security-feature-equipped vehicle audio device 1 displays characters "SECU—RESERVE" temporarily (e.g., for 5 seconds) on the display section 6 of the front panel 3 by the main microcomputer 21 of the main body section 2, it also outputs a predetermined beep sound so as to make the user aurally and visually recognize that the security-feature-equipped vehicle audio device 1 was in a security reservation mode M7 shortly ago.

(4-7) Security OFF Mode

If the security-feature-equipped vehicle audio device 1 is in a security mode M4, in a warning mode M5 or in an alarm mode M6 of a security detection mode M3 and the front panel 3 is not fitted to the main body section 2, it shifts into a security OFF mode M8 when the main microcomputer 21 of the main body section 2 recognizes that the key of the vehicle is to "ACC" or "START" of the ignition key switch.

This shift is same as a shift from a security operation control status ST2 into a security release status ST1, where the ordinary vehicle audio feature is available, which takes place when the front panel 3 is fitted to the main body section 2.

In other words, the security-feature-equipped vehicle audio device 1 shifts from the security detection mode M3 into a security OFF mode M8 when the key KEY is set to "ACC" or "START" of the ignition key switch SW instead of that the front panel 3 is fitted to the main body section 2.

Then, the security-feature-equipped vehicle audio device 1 puts the main microcomputer 21 of the main body section 2 into a sleep status and stops reading out the vibration detection signal supplied from the sensor microphone 16 to the interrupt port 21A and also flashing the yellow LED 14 and the red LED 15 in order to stop consuming electric power.

This is because the security-feature needs to be released when the key KEY is set to "ACC" or "START" of the ignition key switch SW since it represents a situation where the user is going to drive the vehicle and clearly a thief is not involved as in a situation where the user fits the front panel 3 to the main body section 2 and hence it is not necessary to make the security-feature operate.

When the security-feature-equipped vehicle audio device 1 shifts from a security detection mode M3 into a security OFF mode M8 and then the front panel 3 is fitted to the main body section 2 once again, the security-feature-equipped vehicle audio device 1 shifts from a security operation control status ST2 into an ordinary operation mode M1 of a security release status ST1.

(5) Switching Control Process Sequence of Security Operation Control Status and Security Release Status Now, the switching control process sequence of switching from a security release status ST1 to a security operation control status ST2 when the front panel 3 is taken out from the main body section 2 and from a security operation control status ST2 to a security release status ST1, where the ordinary vehicle audio feature is available, when the front panel 3 is fitted to the main body section 2 will be described below. This process sequence is based on a switching control process program, which is an application program.

Figure 13:
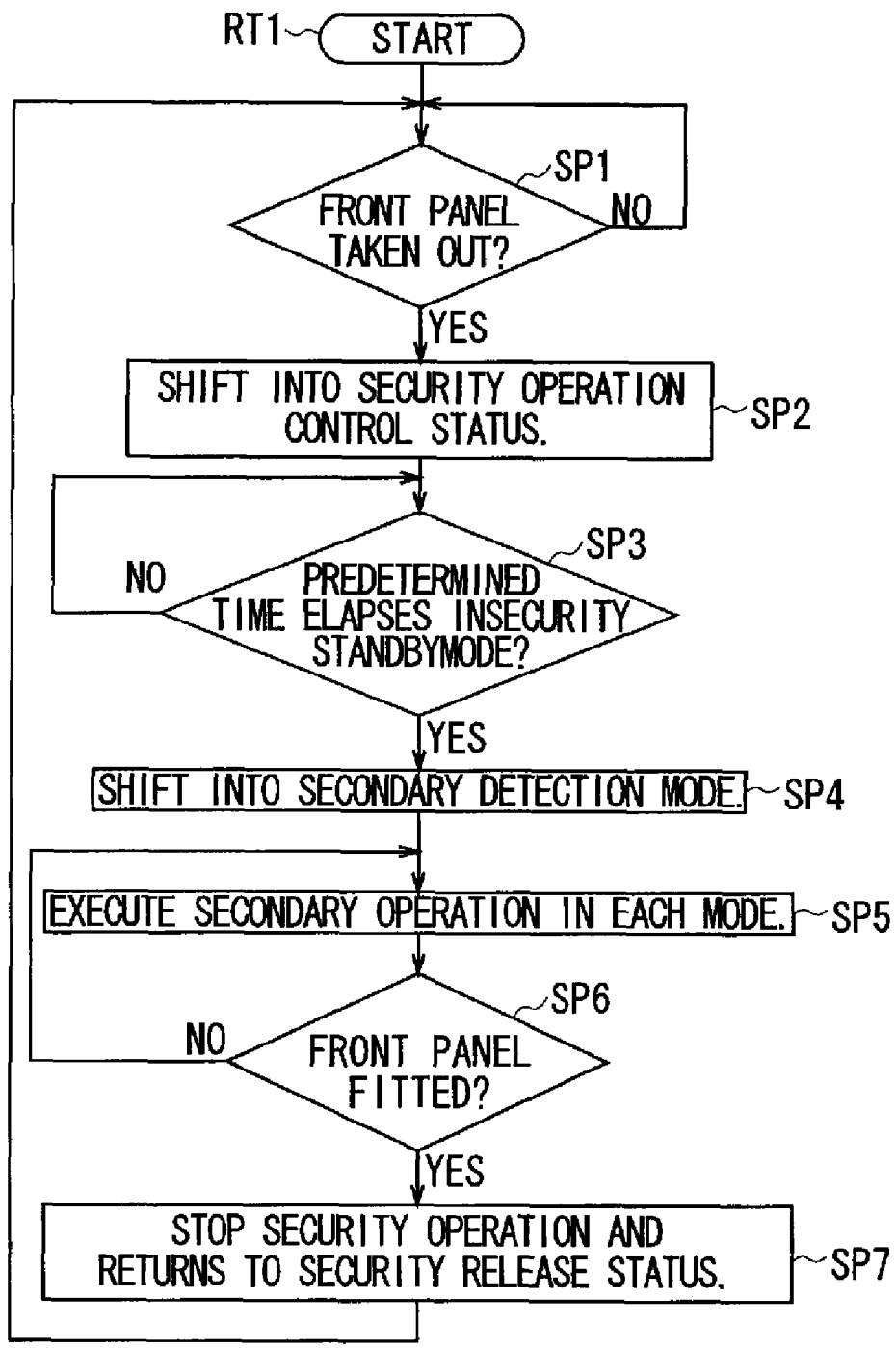
FIG. 13 is a flowchart of the switching control process sequence of a security operation control status and a security release status.

Referring to FIG. 13, the main microcomputer 21 of the main body section 2 of the security-feature-equipped vehicle audio device 1 reads out the switching control process program from the ROM and then starts it on the RAM. The switching control process program is an application program. Then, it enters the starting step of routine RT1 according to the program and moves to the next step, or Step SP1. When "ON" is selected from the character "S. SET—ON/OFF" of the security selection/setting menu being displayed on the display section 6 as shown in FIG. 5, the main microcomputer 21 of the main body section 2 determines if the front panel 3 is taken out from the main body section 2 or not.

If the answer to the question of Step SP1 is negative, the main microcomputer 21 of the main body section 2 returns to Step SP1 again and waits until the front panel 3 is taken out from the main body section 2.

If the answer to the question of Step SP1 is positive, it means that the front panel 3 is taken out from the main body section 2 and then the main microcomputer 21 of the main body section 2 proceeds to the next step, or Step SP2.

In Step SP2, the main microcomputer 21 of the main body section 2 shifts from a security release status ST1 into a security operation control status ST2 on an assumption that the user is leaving the vehicle because the copolymerized polyester 3 is taken out from the main body section 2 and then proceeds to the next step, or Step SP3.

To be more accurate, the main microcomputer 21 of the main body section 2 shifts into a security standby mode M2 of a security operation control status ST2.

Then, in Step SP3, the main microcomputer 21 of the main body section 2 determines if a predetermined time period (e.g., default 1 minute that the user may take before leaving the vehicle in a security standby mode) has passed since the shift into the security standby mode M2 of a security operation control status ST2 or not.

If the answer to the question is negative, it means that the predetermined time period has not elapsed since the shift into the security standby mode M2. Then, the main microcomputer 21 of the main body section 2 waits for a predetermined period of time.

If, on the other hand, the answer to the question in Step SP3 is positive, it means that a predetermined period of time has already elapsed since the shift into the security standby mode M2. Then, the main microcomputer 21 of the main body section 2 moves to the next step, or Step SP4.

In Step SP4, the main microcomputer 21 of the main body section 2 shifts from the security standby mode M2 into a security detection mode M3 of a security operation control status ST2 and then proceeds to the next step, or Step SP5.

In Step SP5, the main microcomputer 21 of the main body section 2 executes a security operation of emitting an alarm sound as described above it shifts from the security mode M4 of a security detection mode M3 into a warning mode 5 or an alarm mode M6 and the proceeds to the next step, or Step SP6.

In Step SP6, the main microcomputer 21 of the main body section 2 determines that the front panel 3 is fitted to the main body section 2 in the security operation control status ST2.

If the answer to the question is negative, it means that it has shifted into a security standby mode M2, a security detection mode 3, a security reservation mode M7 or a security OFF mode M8 of the security operation control status ST2 but the front panel 3 is not fitted to the main body section 2. Then, the main microcomputer 21 of the main body section 2 returns to Step SP5 and repeats the above-described security operation.

If, on the other hand, the answer to the question is positive, it means that front panel 3 is fitted to the main body section 2 in the security operation control status ST2. Then, the main microcomputer 21 of the main body section 2 proceeds to the next step, or Step SP7.

In Step SP7, the main microcomputer 21 of the main body section 2 stops the security operation because the front panel 3 has been fitted to the main body section 2 and returns from the security operation control status ST2 to the security release status ST1 and also to Step SP1, where it repeats the above-described process.

(6) Specific Examples of Security Operation

Now, specific situations where the security-feature-equipped vehicle audio device 1 performs a security operation will be described below.

(6-1) Situation where Occurrence of Theft can be Presumed

Figure 14:
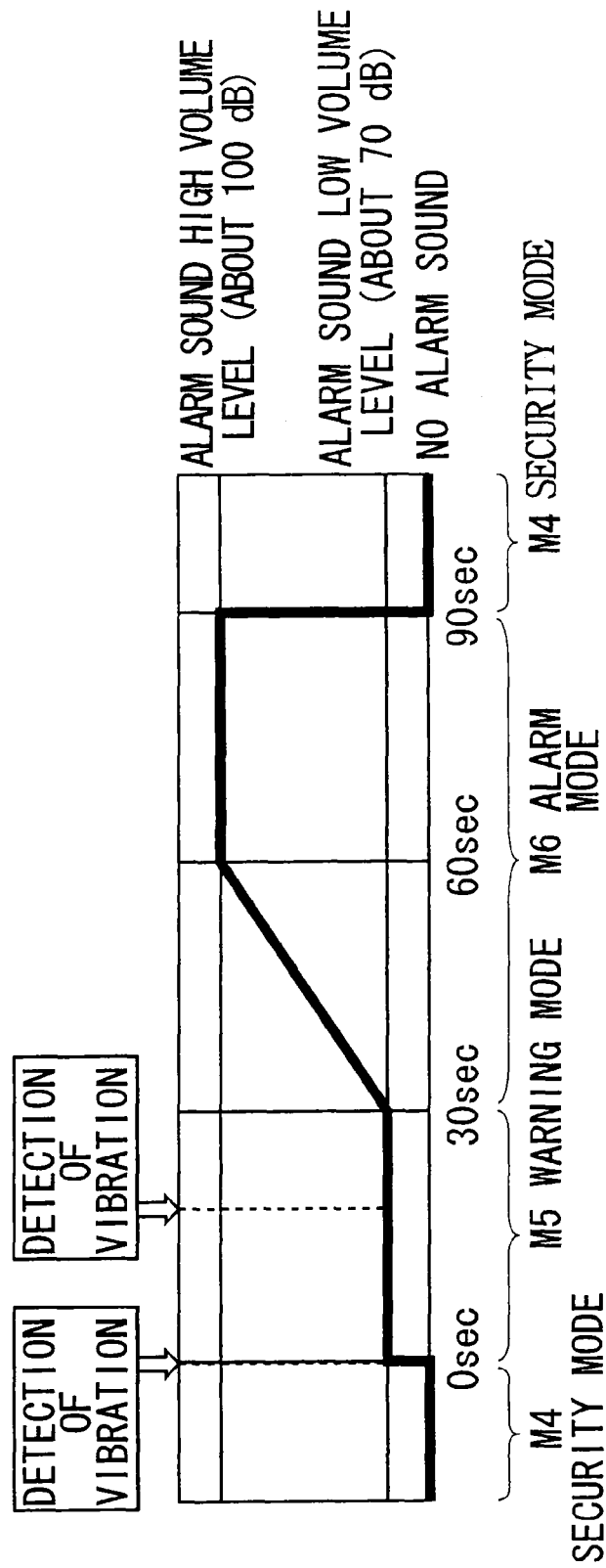
FIG. 14 is a schematic illustration of output status of an alarm sound when a security-feature-equipped vehicle audio device according to the embodiment of the present invention is being stolen.

When the security-feature-equipped vehicle audio device 1 shifts from a security standby mode M2 into a security mode M4 of a security detection mode M3 as shown in FIG. 9, it does not output any alarm sound but, as it detects the first vibration by way of the sensor microphone 16 in the security mode M4, it shifts into a warning mode M5 and outputs an alarm sound at a small volume level (of about 70 dB) as shown in FIG. 14.

Then, as the security-feature-equipped vehicle audio device 1 detects the second vibration by way of the sensor microphone 16 while it outputs an alarm sound in the warning mode M5, it shifts into an alarm mode M6 that lasts for 1 minute after the elapse of 30 seconds in the warning mode M5.

In the alarm mode M6, the security-feature-equipped vehicle audio device 1 outputs an alarm sound, gradually raising the volume level thereof in 12 steps from the volume level of about 70 dB, at which it outputs an alarm sound in the warning mode M5, to the volume level of about 100 dB in the former 30 seconds. Then, it outputs the same alarm sound at a high volume level of about 100 dB (the highest volume level) for the latter 30 seconds.

When the 1 minute alarm mode M6 ends, the security-feature-equipped vehicle audio device 1 stops outputting the alarm sound and automatically shifts from the alarm mode M6 into a security mode M4 to follow the main loop of shift from the security mode M4 to a security mode M5, then to an alarm mode M6, then to a security mode M4 . . . .

Figure 15:
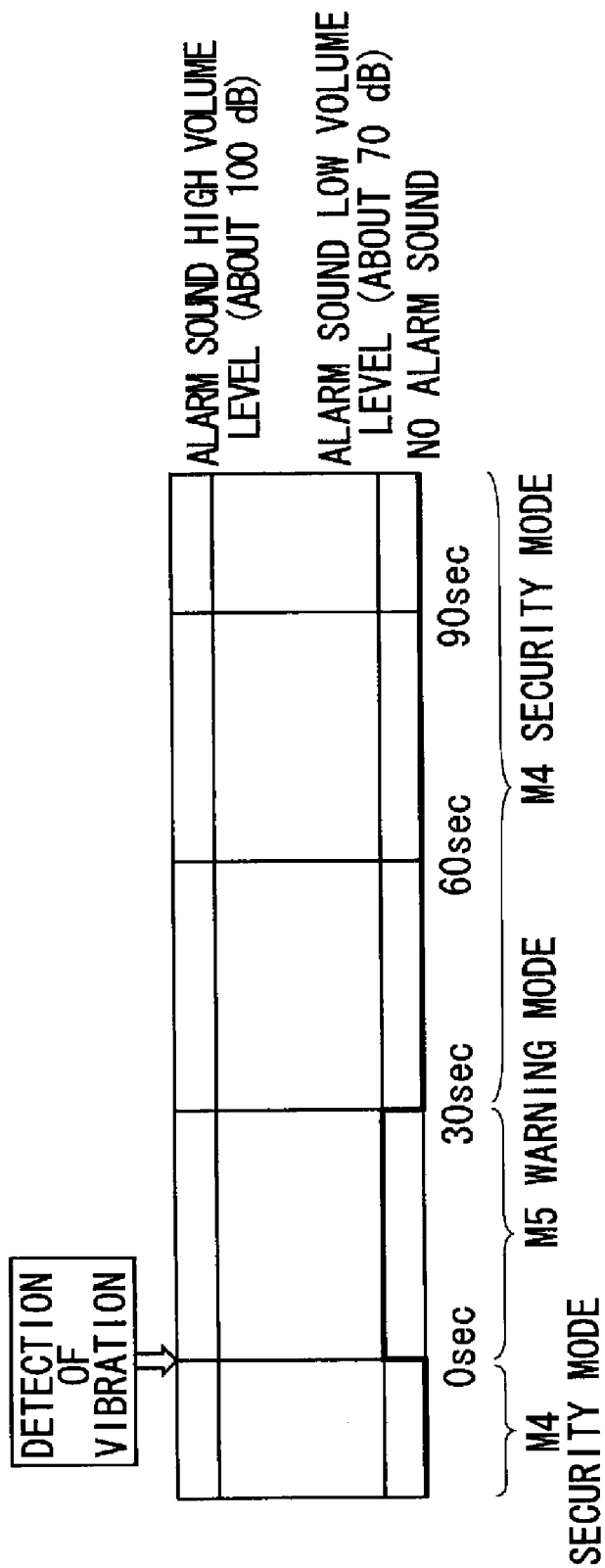
FIG. 15 is a schematic illustration of output status of an alarm sound when vibration is detected for the first time.

(6-2) Situation where Operation Error can be Presumed for Detection Outcome of Sensor Microphone As shown in FIG. 15, the security-feature-equipped vehicle audio device 1 does not output any alarm sound when it shifts from a security standby mode M2 into a security mode M4 of a security detection mode M3 but it shifts into a warning mode M5 and outputs an alarm sound at a low volume level (of about 70 dB) for 30 seconds if it detects the first vibration by way of the sensor microphone 16 in the security mode M4.

Then, the security-feature-equipped vehicle audio device 1 outputs an alarm sound for 30 seconds in the warning mode M5 but, if the next vibration is not detected by the sensor microphone 16 within that 30 seconds, the detected first vibration is not due to a thief but accidental vibration or due to an operation error so that it does not shift into an alarm mode M6 and returns to the security mode M4, stopping outputting the alarm sound after the elapse of the 30 seconds.

(6-3) Situation where User Takes Time for Riding into Vehicle

Figure 16:
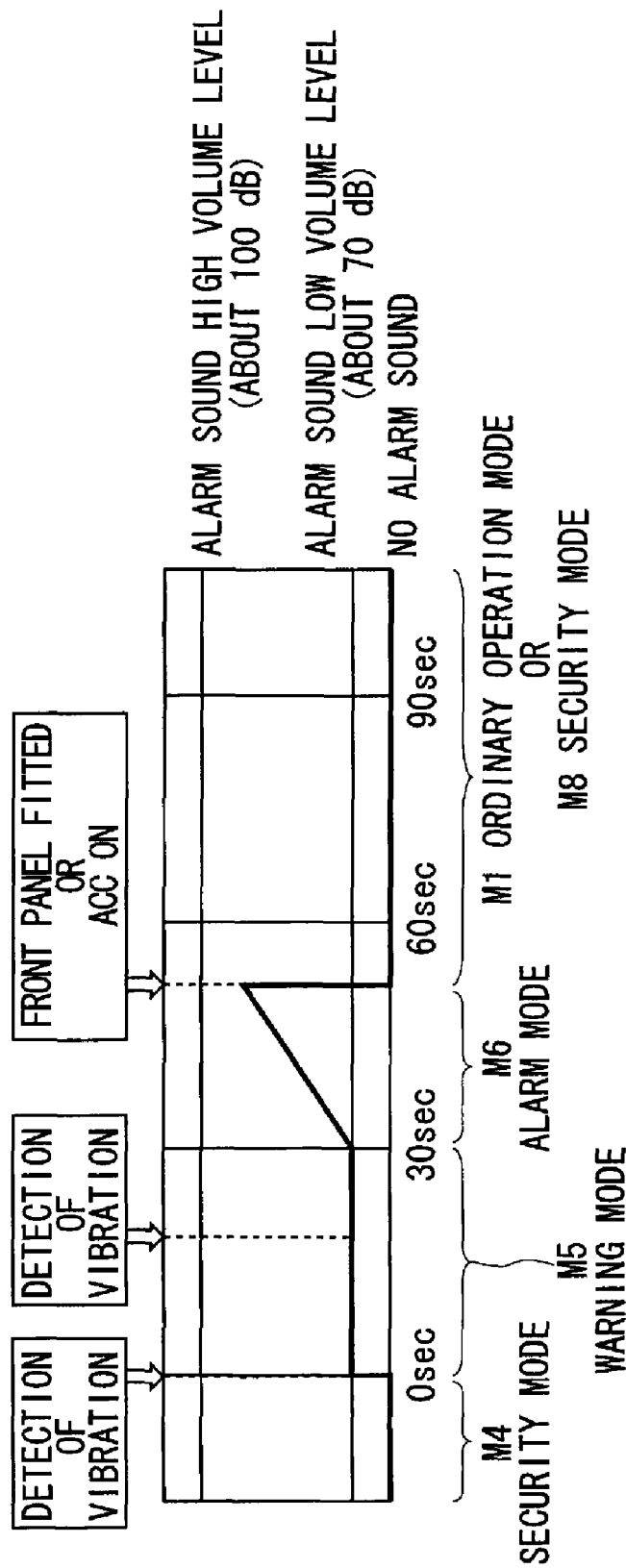
FIG. 16 is a schematic illustration of output status of an alarm sound when vibration is detected twice while the user is in the vehicle.

As shown in FIG. 16, the security-feature-equipped vehicle audio device 1 does not output any alarm sound when it shifts from a security standby mode M2 into a security mode M4 of a security detection mode M3 and outputs an alarm sound at a low volume level (of about 70 dB) for 30 seconds if it detects the first vibration generated when the user open one of the doors of the vehicle by way of the sensor microphone 16 in the security mode M4.

Then, as the security-feature-equipped vehicle audio device 1 detects the second vibration that is generated when the user who sits on one of the seats of the vehicle shuts the door by way of the sensor microphone 16 while it is outputting an alarm sound for 30 seconds, it shifts into an alarm mode M6 after the elapse of the 30 seconds of the warning mode M5.

Then, the security-feature-equipped vehicle audio device 1 outputs an alarm sound, gradually raising the volume level thereof in 12 steps from the volume level of about 70 dB, at which it outputs an alarm sound in the warning mode M5, to the volume level of about 100 dB in the former 30 seconds in the alarm mode M6. However, if the front panel 3 is fitted to the main body section 2 during the 30 seconds, it shifts into an ordinary operation mode M1 of a security release status ST1 and stops outputting the alarm sound.

As pointed out above, the security-feature-equipped vehicle audio device 1 outputs an alarm sound, gradually raising the volume level thereof in 12 steps from the volume level of about 70 dB, at which it outputs an alarm sound in the warning mode M5, to the volume level of about 100 dB in the former 30 seconds in the alarm mode M6. However, if the key KEY is set to "ACC" or "START" of the ignition key switch SW during the 30 seconds, it shifts into a security OFF mode M8 and stops outputting the alarm sound.

In other words, the security-feature-equipped vehicle audio device 1 does not shift from a warning mode M5 into an alarm mode M6 when the front panel 3 is fitted to the main body section 2 or the key is set to "ACC" or "START" of the ignition key switch SW before the 30 seconds elapses of the warning mode.

However, if the user takes time for riding into the vehicle and the 30 seconds of the warning mode M5 elapse before the user's riding action ends, the security-feature-equipped vehicle audio device 1 shifts into an alarm mode M6 and gradually raises the volume level thereof. In such a situation, the security-feature-equipped vehicle audio device 1 stops outputting the alarm sound when the front panel 3 is fitted to the main body section 2 or the key KEY is set to "ACC" or "START" of the ignition key switch SW.

(6-4) Situation where User does not Take Time for Riding into Vehicle

Figure 17:
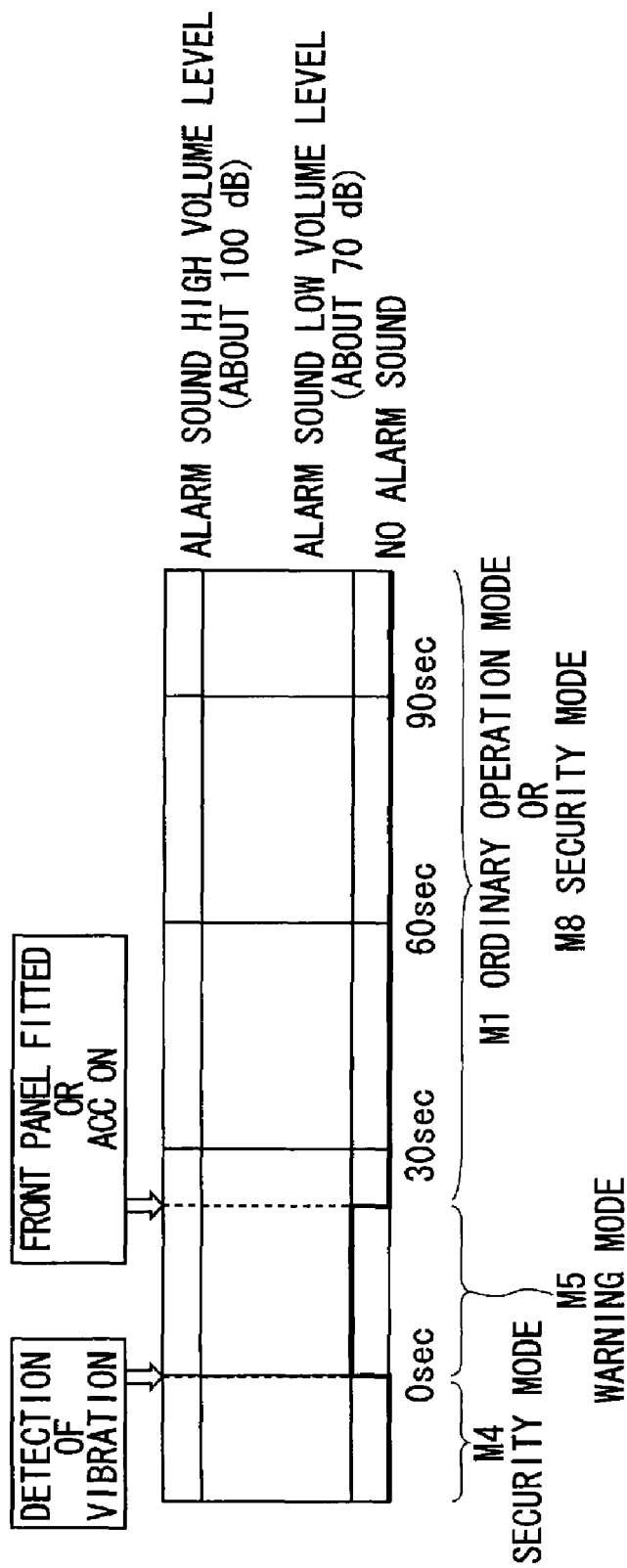
FIG. 17 is a schematic illustration of output status of an alarm sound when the user is in the vehicle as usual.

As shown in FIG. 17, the security-feature-equipped vehicle audio device 1 does not output any alarm sound when it shifts from a security standby mode M2 into a security mode M4 of a security detection mode M3 but it shifts into a warning mode M5 and outputs an alarm sound at a low volume level (of about 70 dB) for 30 seconds if it detects the first vibration generated when the user open one of the doors of the vehicle by way of the sensor microphone 16 in the security mode M4.

Then, when the front panel 3 is fitted to the main body section 2 while it is outputting an alarm sound for 30 seconds in the warning mode M5, the security-feature-equipped vehicle audio device 1 shifts from the warning mode M5 into an ordinary operation mode M1 of a security release status ST1 and stops outputting the alarm sound regardless if it detects the second vibration by way of the sensor microphone 16 or not.

Additionally, when the key KEY is set to "ACC" or "START" of the ignition key switch SW while it is outputting an alarm sound for 30 seconds in the warning mode M5, the security-feature-equipped vehicle audio device 1 shifts from the warning mode M5 into a security OFF mode M8 and stops outputting the alarm sound regardless if it detects the second vibration by way of the sensor microphone 16 or not.

In other words, the security-feature-equipped vehicle audio device 1 stops outputting the alarm sound when the front panel 3 is fitted to the main body section 2 or the key KEY is set to "ACC" or "START" of the ignition key switch SW before the elapse of the 30 seconds of the warning mode M5 regardless if it detects the second vibration by way of the sensor microphone 16 or not.

(7) Operation and Effect

With the above-described arrangement, when the front panel 3 is fitted to the main body section 2 and the key KEY of the vehicle is set to "ACC" or "START" of the ignition key switch SW, the security-feature-equipped vehicle audio device 1 can execute the ordinary vehicle audio operation without executing any security operation in an ordinary operation mode M1 of a security release status ST1.

Thereafter, when the user takes out the front panel 3 from the main body section 2 to leave the vehicle, the security-feature-equipped vehicle audio device 1 automatically shifts from a security release status ST1 into a security operation control status ST2 because the user is away from the vehicle and the main body section 2 of the security-feature-equipped vehicle audio device 1 is left in the vehicle in an environment where the main body section 2 can become an easy prey of a thief.

Then, as the user comes back into the vehicle and fits the front panel 3 to the main body section 2, the security-feature-equipped vehicle audio device 1 automatically shifts from the security operation control status ST2 back into an ordinary operation mode M1 of a security release status ST1.

In this way, the security-feature-equipped vehicle audio device 1 can shift from a security release status ST1 into a security operation control status ST2 when the front panel 3 is taken out from the main body section 2 and then from a security operation control status ST2 back into a security release status ST1 when the front panel 3 is fitted to the main body section 2.

Therefore, when the user gets into the vehicle where the security-feature-equipped vehicle audio device 1 has shifted into a security operation control status ST2, the user is not required to perform any particular operation to make the security-feature-equipped vehicle audio device 1 shift back into a security release status ST1. In other words, the user only has to fit the front panel 3 back to the main body section 2 so that the user can handle the security-feature-equipped vehicle audio device 1 very easily.

Additionally, after shifting into a security standby mode M2 of a security operation control status ST2, the security-feature-equipped vehicle audio device 1 can automatically shift into a security detection mode M3 where it can detect any vibration applied to the vehicle after the elapse of a certain time period that is determined by taking the time required for the user to get out from the vehicle into consideration.

After shifting into a security detection mode M3, the security-feature-equipped vehicle audio device 1 remains in a security mode M4 so long as it does not detect any vibration but it shifts into a warning mode M5 and outputs an alarm sound at a low volume level when it detects the first vibration. Subsequently, it shifts into an alarm mode M6 and outputs an alarm sound at a high volume level when it detects the second vibration for 30 seconds in the warning mode M5.

Then, as 1 minute passes after shifting into an alarm mode M6, the security-feature-equipped vehicle audio device 1 automatically shifts from the alarm mode M6 into a security mode M4. Thus, so long as it is in a security detection mode M3, it repeatedly follows the main loop of a security mode M4, a warning mode M5 and an alarm mode M6. In other words, after shifting into an alarm mode M6 and outputting an alarm sound, the security-feature-equipped vehicle audio device 1 repeatedly follows the main loop of a security mode M4, a warning mode M5 and an alarm mode M6 without requiring any resetting operation.

Additionally, the security-feature-equipped vehicle audio device 1 is forced to shift into a security reservation mode M7 when the number of times by which the security-feature-equipped vehicle audio device 1 shifts into a alarm mode M6 gets to five when the total time to which the main microcomputer 21 operates in statuses other than the sleep status in a security detection mode M3 gets to 60 minutes because the battery can highly probably run out if it goes on executing the security operation to consume power from the vehicle battery BATT.

As the security-feature-equipped vehicle audio device 1 shifts into a security reservation mode M7, it puts the main microcomputer 21 of the main body section 2 into a sleep status and stops reading out the vibration detection signal supplied from the sensor microphone 16 to the interrupt port 21A and also flashing the yellow LED 14 and the red LED 15 so as not to consume power any further in order to prevent the vehicle battery BATT from running out in advance while the user is away from the vehicle.

Thus, with the above-described arrangement, the main body section 2 of the security-feature-equipped vehicle audio device 1 is equipped with security-features and adapted to suspend the ongoing security operation when the front panel 3 is fitted to it and resume the security operation when the front panel 3 is taken out from it. Therefore, the main body section 3 is protected against thieves to the main body section 2 without requiring any cumbersome operation to remarkably improve the security effect than ever.

(8) Other Embodiments

Figure 18:
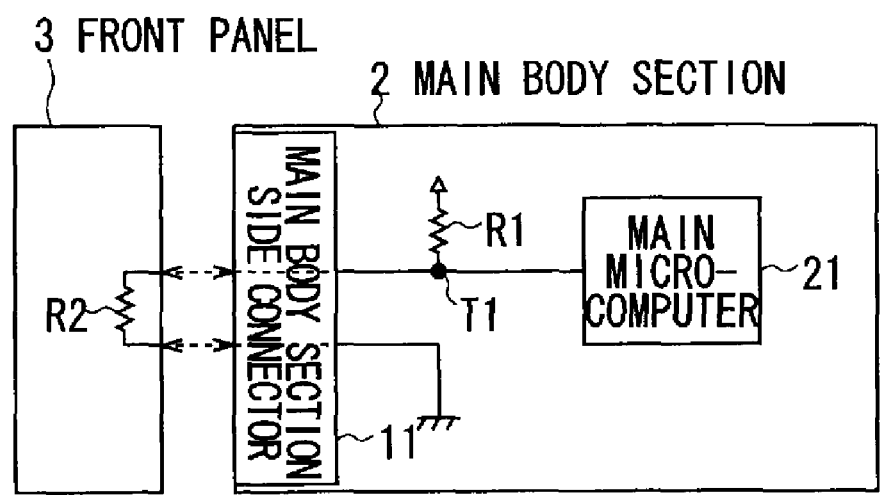
FIG. 18 is a schematic illustration of the arrangement for defecting a fitted state or an unfitted state of the front panel according to another embodiment of the present invention.

As described above, the voltage level at the connection point T1 between the main microcomputer 21 and the main body side connector 11 is raised by a pull-up resistor R1 arranged in the main body section 2 when the front panel 3 is taken out from the main body section 2 and the hence main microcomputer 21 recognizes that the front panel 3 is not fitted to the main body section 2 according to the electric potential, whereas the main microcomputer 21 in the main body section 2 is grounded by way of the main body section side connector 11 and the front panel 3 to lower the electric potential of the connection point T1 to the ground level when the front panel 3 is fitted to the main body section 2 and hence the main microcomputer 21 recognizes that the front panel 3 is fitted to the main body section 2 in the above-described embodiment as illustrated in FIG. 4. However, the present invention is by no means limited to such an arrangement and the electric potential of the connection point T1 may not necessarily be lowered to the ground level. Alternatively, it may be so arranged that a resistor R2 is provided in the inside behind the front panel 3 and the main microcomputer 21 recognizes that the front panel 3 is fitted to the main body section 2 according to the electric potential produced as a result of division of the voltage by the pull up resistor R1 and the resistor R2 as illustrated in FIG. 18 where the components same as those of FIG. 4 are denoted respectively by the same reference symbols.

Furthermore, the above-described embodiment shifts into a security operation control status ST2 when the key KEY is set neither to "ACC" nor to "START" of the ignition key switch SW and the front panel 3 is taken out from the main body section 2 and subsequently it shifts into a security release status ST1 when the key KEY is set to "ACC" or "START" of the ignition key switch SW but the front panel 3 is not fitted to the main body section 2 or when the front panel 3 is fitted to the main body section 2 but the key KEY is set neither to "ACC" nor to "START" of the ignition key switch SW.

However, the present invention is not limited thereto. It may alternatively be so arranged that a security-feature-equipped vehicle audio device 1 according to the embodiment of the present invention shifts into a security operation control status ST2 when the front panel 3 is taken out from the main body section 2 and it shifts into a security release status ST1 when the front panel 3 is fitted to the main body section 2 subsequently. It is regardless if the vehicle key KEY is put into the ignition key switch SW or not so that a security-feature-equipped vehicle audio device 1 according to the embodiment of the present invention may accommodate a vehicle where the ignition key switch SW does not have any "ACC".

While 15 seconds, 1 minute and 3 minutes are provided for the standby time in a security standby mode M3 in the above-described embodiment, the present invention is by no means limited thereto and other time periods such as 10 seconds, 30 seconds, 1 minute and 5 minutes may alternatively be provided for the purpose of the present invention.

While the duration of a warning mode M5 is defined to be equal to 30 seconds and that of an alarm mode M6 is defined to be equal to 1 minute in the above-described embodiment, the present invention is by no means limited thereto and some other combination of time periods such as 1 minute for a warning mode M5 and 30 seconds for an alarm mode M6 may alternatively be used for the purpose of the present invention.

While an alarm sound is output at the volume level (of about 70 dB) of a warning mode M5 in the former 30 seconds of alarm mode M6 and the volume level of the warning mode is raised in 12 steps to the highest volume (of about 100 dB) in an alarm mode M6 in the above-described embodiment, the present invention is by no means limited thereto and the volume level of the warning sound may be alternatively raised in 5 steps, in 20 steps or in some other number of steps for the purpose of the present invention.

While the above described embodiment is forced to shift into a security reservation mode M7 when the total number of times of shifts into a warning mode M6 gets to five or the total duration of time in which the main microcomputer 21 operates in statuses other than the sleep status gets to 60 minutes. However, the present invention is by no means limited thereto. It may alternatively be so arranged that it is forced to shift into a security reservation mode M7 when the total number of times or the total duration of time gets to any of various appropriate values.

Figure 19:
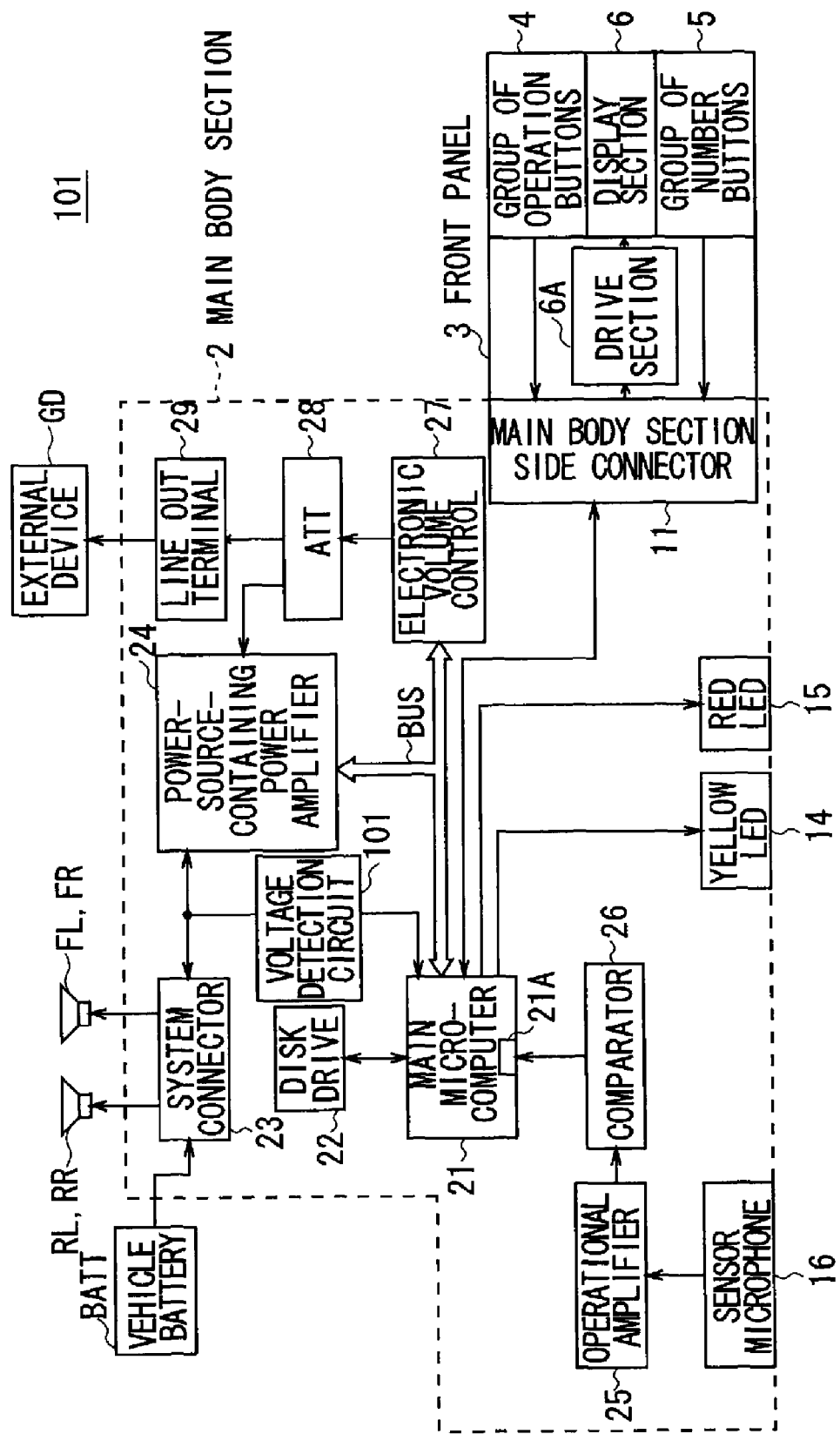
FIG. 19 is a schematic block diagram of security-feature-equipped vehicle audio device according to another embodiment of the present invention, showing the circuit configuration thereof.

While the above described embodiment is forced to shift into a security reservation mode M7 when the total number of times of shifts into a warning mode M6 gets to five or the total duration of time in which the main microcomputer 21 operates in statuses other than the sleep status gets to 60 minutes. However, the present invention is by no means limited thereto. It may alternatively be so arranged that the voltage value of the car battery BATT is monitored by the main micro-computer 21 by way of a voltage detection circuit 101 arranged between the system connector 23 and the main micro-computer 21 as shown in FIG. 19, which illustrates another embodiment of security-feature-equipped car audio device 100 according to the present invention and where the components same as those of FIG. 3 are denoted respectively by the same reference symbols, so that the requirement to be met for forcibly shifting into a security reservation mode M7 (getting to fraction of total number of times or the total operation time) may be adaptively modified.

Figure 12:
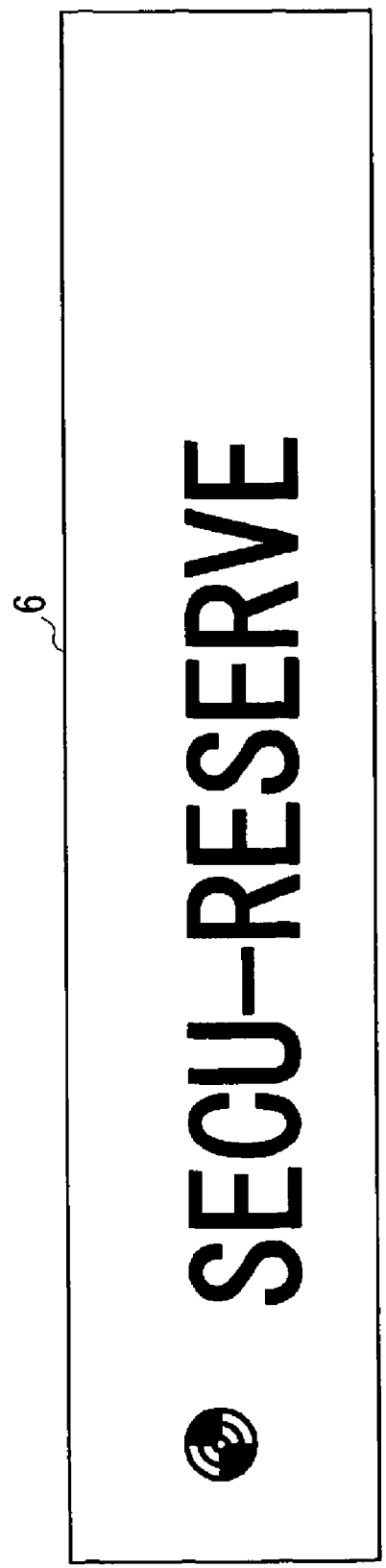
FIG. 12 is a schematic illustration of a mode notification image for a security reservation mode that can be used for the purpose of the present invention.

The main microcomputer 21 of the main body section 2 follows the switching control process sequence (FIG. 12) in the routine RT1 according to a switching control process program, which is an application program, for switching from a security release status ST1 to a security operation control status ST2 or vice versa in the above-described embodiment. However, the present invention is not limited thereto and it may alternatively be so arranged that the main microcomputer 21 follows the switching control process sequence according to a switching control process program installed from a recording medium such as a CD or a semiconductor memory, downloaded from the Internet or installed in some other way for switching from a security release status ST1 to a security operation control status ST2 or vice versa.

While the above-described embodiment shifts into a alarm mode M6 to output an alarm sound at a high volume level when it detects vibration for the second time in a warning mode M5 and the 30 minutes of the warning mode M5 elapses, the present invention is by no means limited thereto and it may alternatively be so arranged that a security-feature-equipped vehicle audio device 1 according to the embodiment of the present invention immediately shifts into an alarm mode M6 to output an alarm sound at a high volume level when it detects vibration for the second time in a warning mode M5.

While the above-described embodiment operates a sensor microphone 16, the present invention by no means limited thereto and any other vibration detection means such as a 3-axes acceleration sensor may alternatively be employed so long as it can detect vibrations.

While the above-described embodiment of security-feature-equipped vehicle audio device according to the embodiment of the present invention is realized by using a sensor microphone 16 that operates as a vibration detection unit, a main microcomputer 21 that operates as an alarm sound output unit, an electronic volume control 27, a power-source-containing power amplifier 24, a main microcomputer 21 that operates as a control unit. However, the present invention is not limited thereto and a security-feature-equipped vehicle audio device according to the embodiment of the present invention may alternatively be realized by using a vibration detection unit, an alarm sound output unit and a control unit having circuit configurations other than those described above.

A security-feature-equipped vehicle audio device and a security-feature control method of an on-vehicle device according to the embodiment of the present invention can find applications in vehicle audio/video devices, vehicle navigation devices and other vehicle devices that are equipped with security-features.

It should be understood by those skilled in the art that various modifications, combinations, sub-combinations and alterations may occur depending on design requirements and other factors insofar as they are within the scope of the appended claims or the equivalents thereof.

What is claimed is:

1. A security-feature-equipped on-vehicle device comprising:
    a main body section including a front side;
    a front panel detachably attached to the front side of the main body section, the front panel including a display section;
    vibration detection means for detecting vibration;
    alarm sound output means for outputting a predetermined alarm sound from a speaker; and
    control means for placing the device in a sleep mode when the front panel is detached from the main body section, controlling the device to go from the sleep mode to a warning mode when vibration is detected for a first time by the vibration detection means, causing the alarm sound output means to output the alarm sound at a predetermined first volume level when the device is in the warning mode, shifting the device from the warning mode to an alarm mode when vibration is detected for a second time within a predetermined time period, causing the alarm sound output means to output the alarm sound at a predetermined second volume level higher than the first volume level when the device is in the alarm mode, returning the device to the sleep mode thereby stopping the alarm sound output means outputting the alarm sound, and placing the device in a security reservation mode when a number of times the device shifts to the alarm mode exceeds a predetermined threshold value,
    wherein the control means stops communication with the vibration detection means when the device is in the security reservation mode.

2. The security-feature-equipped on-vehicle device according to claim 1, wherein
    the control means raises the volume level of the alarm sound stepwise from the first volume level to the second volume level when the device shifted to the alarm mode.

3. The security-feature-equipped on-vehicle device according to claim 2, wherein
    the control means returns the device to the sleep mode and stops the alarm sound output means outputting the alarm sound when the control means recognizes a predetermined requirement is met for returning the device to the sleep mode after alarm sound output means shifts to an alarm mode.

4. The security-feature-equipped on-vehicle device according to claim 3, wherein
    the control means reduces power consumption by placing the device in the security reservation mode.

5. The security-feature-equipped on-vehicle device according to claim 3, wherein
    the control means reduces power consumption by forcibly returning the device to the sleep mode when the total transition time spent in transition to a mode other than the sleep mode exceeds a predetermined threshold value as the predetermined requirement.

6. The security-feature-equipped on-vehicle device according to claim 1, wherein
    the control means controls the output condition of the alarm sound outputted by the alarm sound output means, and also controls the flashing of a predetermined light emitting means in accordance with a corresponding selection/setting provided by the user.

7. The security-feature-equipped on-vehicle device according to claim 6, wherein
    the control means stops the flashing of the predetermined light emitting means in accordance with the corresponding selection/setting provided by the user.

8. The security-feature-equipped on-vehicle device according to claim 1, wherein
    the control means shifts not immediately from the warning mode to the alarm mode but only after the elapse of a predetermined time in the warning mode in the case where the control means detects vibration for the second time in the warning mode.

9. The security-feature-equipped on-vehicle device according to claim 1,
    wherein the control means places the device in a security release mode when the front panel is attached to the main body section, and
    wherein if the device was placed in the security reservation mode during a time between the front panel being detached and the front panel being attached, then the display indicates that the device is in the security release mode and that the device was previously in the security reservation mode.

10. The security-feature-equipped on-vehicle device according to claim 1,
    wherein the control means includes an interrupt port that is connected to the vibration detection means, and
    wherein the interrupt port stops reading a signal of the vibration detecting means when the device is in the security reservation mode.

11. A security-feature control method of an on-vehicle device comprising:
    causing the device to go to a sleep mode when a front panel that is detachably attached to a front side of a main body section is detached from a main body section;
    a warning mode processing step of causing the device to go from the sleep mode to a warning mode when vibration is detected for the first time by vibration detection means for detecting vibration and having alarm sound output means for outputting the alarm sound output a predetermined alarm sound at a predetermined first volume level from a speaker;
    an alarm mode processing step of controlling the device to shift from the warning mode to an alarm mode when vibration is detected for the second time within a predetermined time period, and to have the alarm sound output means output the alarm sound at a predetermined second volume level higher than the first volume level;

causing the device to return to the sleep mode from the warning mode thereby stopping the alarm sound output means outputting the alarm sound; and causing the device to go to a security reservation mode when a number of times the device shifts to the alarm mode exceeds a predetermined threshold value and when the device is in the security reservation mode stopping communication with the vibration detection means.

12. The security-feature control method according to claim 11, further comprising:

raising the volume level of the alarm sound stepwise from the first volume level to the second volume level when the device shifts to the alarm mode.

13. The security-feature control method according to claim 12, further comprising:

returning the device to the sleep mode and stopping the alarm sound output means outputting the alarm sound when a predetermined requirement is met for returning the device to the sleep mode after the device shifts to the alarm mode.

14. The security-feature control method according to claim 13, further comprising:

reducing power consumption by placing the device in the security reservation mode.

15. The security-feature control method according to claim 13, further comprising:

reducing the power consumption by forcibly returning the device to the sleep mode when the total transition time spent in transition to a mode other than the sleep mode exceeds a predetermined threshold value as the predetermined requirement.

16. The security-feature control method according to claim 11, further comprising:

controlling the output condition of the alarm sound outputted by the alarm sound output means, and also controlling the flashing of a predetermined light emitting means in accordance with a corresponding selection/setting provided by the user.

17. The security-feature control method according to claim 16, further comprising:

stopping the flashing of the predetermined light emitting means in accordance with the corresponding selection/setting provided by the user.

18. The security-feature control method according to claim 11, further comprising:

causing the device to shift not immediately from the warning mode to the alarm mode but only after the elapse of a predetermined time in the warning mode in the case where the device detects vibration for the second time in the warning mode.

19. A security-feature-equipped on-vehicle device comprising:

a main body section including a front side;

a front panel detachably attached to the front side of the main body section, the front panel including a display section;

a vibration detection unit that detects vibration;

an alarm sound output unit that outputs a predetermined alarm sound from a speaker; and an alarm sound control unit that places the device in a sleep mode when the front panel is detached from the main body section, that causes the device to go from the sleep mode to a warning mode when vibration is detected for a first time by the vibration detection unit, that causes the alarm sound output unit to output the alarm sound at a predetermined first volume level when the device is in the warning mode, that shifts the device from the warning mode to an alarm mode when vibration is detected for a second time within a predetermined time period, that causes the alarm sound output unit to output the alarm sound at a predetermined second volume level higher than the first volume level when the device is in the alarm mode, that returns the device to the sleep mode thereby stopping the alarm sound output unit from outputting the alarm sound, and that places the device in a security reservation mode when a number of times the device shifts to the alarm mode exceeds a predetermined threshold value, wherein the control unit stops communication with the vibration detection unit when the device is in the security reservation mode.

20. The security-feature-equipped on-vehicle device according to claim 19, wherein the control unit places the device in a security release mode when the front panel is attached to the main body section, and wherein if the device was placed in the security reservation mode during a time between the front panel being detached and the front panel being attached, then the display indicates that the device is in the security release mode and that the device was previously in the security reservation mode.

* * * * *